US009400977B2

(12) United States Patent
Brown et al.

(10) Patent No.: US 9,400,977 B2
(45) Date of Patent: Jul. 26, 2016

(54) USER DEVICE ENABLING ACCESS TO PAYMENT INFORMATION IN RESPONSE TO MECHANICAL INPUT DETECTION

(71) Applicant: Apple Inc., Cupertino, CA (US)

(72) Inventors: Jeremy T. Brown, San Francisco, CA (US); Zachary A. Rosen, San Francisco, CA (US); Morgan J. Grainger, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/475,424

(22) Filed: Sep. 2, 2014

(65) Prior Publication Data

US 2015/0348009 A1 Dec. 3, 2015

Related U.S. Application Data

(60) Provisional application No. 62/004,338, filed on May 29, 2014.

(51) Int. Cl.
*G06F 19/00* (2011.01)
*G06Q 20/32* (2012.01)
(Continued)

(52) U.S. Cl.
CPC ............ *G06Q 20/3227* (2013.01); *G06Q 20/20* (2013.01); *G06Q 20/204* (2013.01);
(Continued)

(58) Field of Classification Search
CPC .... G07F 7/1008; G07F 7/1016; G06Q 20/341
USPC .......................................... 235/380, 379, 383
See application file for complete search history.

(56) References Cited

U.S. PATENT DOCUMENTS 6,282,612 B1 8/2001 Sakajiri et al.
6,703,918 B1 3/2004 Kita
(Continued)

FOREIGN PATENT DOCUMENTS

EP 2388744 A2 11/2011
GB 2 277 183 A 10/1994
(Continued)

OTHER PUBLICATIONS

Epstein, Zach, "Video: Forget smartphones and NFC, 'Coin' is the future of payments," Yahoo News, [online], Nov. 14, 2013, Apr. 13, 2012, [retrieved on Nov. 20, 2014], retrieved from the internet <URL: http://news.yahoo.com/video-forget-smartphones-nfc-coin-future-payments-170024328.html>, 8 pages.
(Continued)

*Primary Examiner* — Daniel St Cyr
(74) *Attorney, Agent, or Firm* — Kilpatrick Townsend & Stockton LLP

(57) ABSTRACT

In certain embodiments, an electronic device can include a secure element that detects a mechanical input. The mechanical input can correspond to an instruction to transmit securely stored payment information to another device and/or to release such information to an application on the device (e.g., for use in an in-app commerce transaction). This feature can inhibit or prevent unauthorized transmission of payment information. When the mechanical input is detected, payment information can be transmitted to a point of sale (POS) terminal (e.g., via near-field communication) or released to an app on the device. Further, a user can either use default payment information or interact with the device (before or after providing the mechanical input) to select appropriate payment information for a transaction. For example, the user can select between credit cards, debit cards and/or stored-value cards (e.g., transit card).

51 Claims, 13 Drawing Sheets

(51) Int. Cl.

| | | |
|---|---|---|
| *G06Q 20/36* | (2012.01) | |
| *G06Q 20/20* | (2012.01) | |
| *G06Q 20/34* | (2012.01) | |
| *G06Q 20/40* | (2012.01) | |
| *G07F 7/08* | (2006.01) | |

(52) U.S. Cl.
CPC .......... *G06Q20/327* (2013.01); *G06Q 20/3278* (2013.01); *G06Q 20/352* (2013.01); *G06Q 20/3572* (2013.01); *G06Q 20/36* (2013.01); *G06Q 20/401* (2013.01); *G07F 7/0806* (2013.01); *G07F 7/0833* (2013.01)

(56) References Cited

U.S. PATENT DOCUMENTS

| | | | |
|---|---|---|---|
| 6,974,078 | B1 | 12/2005 | Simon |
| 7,900,833 | B2 | 3/2011 | Silverbrook et al. |
| 8,065,235 | B2 | 11/2011 | Narayanaswami et al. |
| 8,113,438 | B1 | 2/2012 | Leason et al. |
| 8,126,806 | B1 | 2/2012 | DiMartino et al. |
| 8,196,131 | B1 * | 6/2012 | von Behren et al. .......... 717/168 |
| 8,223,024 | B1 | 7/2012 | Petrou |
| 8,335,932 | B2 | 12/2012 | Von Behren |
| 8,346,672 | B1 | 1/2013 | Weiner et al. |
| 8,649,770 | B1 | 2/2014 | Cope et al. |
| 8,666,895 | B2 * | 3/2014 | Grigg et al. ...................... 705/44 |
| 2003/0001722 | A1 | 1/2003 | Smith |
| 2004/0225613 | A1 | 11/2004 | Narayanaswami et al. |
| 2006/0288233 | A1 | 12/2006 | Kozlay |
| 2007/0050618 | A1 | 3/2007 | Roux et al. |
| 2007/0162350 | A1 | 7/2007 | Friedman |
| 2008/0045806 | A1 | 2/2008 | Keppler |
| 2009/0159678 | A1 | 6/2009 | Day et al. |
| 2009/0212902 | A1 | 8/2009 | Haddock |
| 2010/0023449 | A1 | 1/2010 | Skowronek et al. |
| 2011/0165896 | A1 | 7/2011 | Stromberg et al. |
| 2011/0214158 | A1 | 9/2011 | Pasquero et al. |
| 2011/0239304 | A1 * | 9/2011 | Saarisalo .......................... 726/26 |
| 2012/0011572 | A1 | 1/2012 | Chew et al. |
| 2012/0024947 | A1 * | 2/2012 | Naelon .......................... 235/380 |
| 2012/0030043 | A1 | 2/2012 | Ross et al. |
| 2012/0221421 | A1 | 8/2012 | Hammad |
| 2012/0241524 | A1 | 9/2012 | Blot et al. |
| 2012/0244805 | A1 | 9/2012 | Haikonen et al. |
| 2013/0060618 | A1 * | 3/2013 | Barton et al. ............... 705/14.23 |
| 2013/0069985 | A1 | 3/2013 | Wong |
| 2013/0073448 | A1 | 3/2013 | Wall et al. |
| 2013/0111599 | A1 | 5/2013 | Gargiulo |
| 2013/0151400 | A1 | 6/2013 | Makhotin et al. |
| 2013/0173477 | A1 | 7/2013 | Cairns |
| 2013/0332353 | A1 | 12/2013 | Aidasani et al. |
| 2014/0058937 | A1 | 2/2014 | Watson |
| 2014/0108260 | A1 | 4/2014 | Poole et al. |
| 2014/0129438 | A1 | 5/2014 | Desai et al. |
| 2014/0244495 | A1 | 8/2014 | Weiner et al. |
| 2014/0325614 | A1 * | 10/2014 | Rhelimi ........................... 726/4 |
| 2015/0058191 | A1 | 2/2015 | Khan et al. |

FOREIGN PATENT DOCUMENTS

| | | |
|---|---|---|
| GB | 2407189 A | 4/2005 |
| WO | 2008147457 A1 | 12/2008 |
| WO | 2009039419 A1 | 3/2009 |
| WO | 2010111002 A1 | 9/2010 |
| WO | 2014122451 | 8/2014 |
| WO | 2014143916 A2 | 9/2014 |

OTHER PUBLICATIONS

"Bell ID Secure Element in the Cloud," (product data sheet), Bell ID, [online], 2014, [retrieved on Nov. 20, 2014], retrieved from the internet <URL: http://www.bellid.com/products/secure-element-in-the-cloud/>, 4 pages.
International Search Report and Written Opinion mailed Sep. 6, 2014 in PCT Application No. PCT/US13/32529, 19 pages.
International Search Report and Written Opinion mailed Apr. 6, 2015 in PCT/US14/28095, 14 pages.
Brown, U.S. Appl. No. 14/475,268, filed Sep. 2, 2014.
Khan, U.S. Appl. No. 14/475,263, filed Sep. 2, 2014.
Brown et al., U.S. Appl. No. 62/004,338, filed May 29, 2014.
Haggerty et al., U.S. Appl. No. 61/909,717, filed Nov. 27, 2013.
Maragoudakis, International Patent Application No. PCT/US2013/032529 filed on Mar. 15, 2013.
Maragoudakis, U.S. Appl. No. 14/775,349, filed Sep. 11, 2015.
International Search Report and Written Opinion mailed Jun. 30, 2015 in PCT/US2015/024447, 9 pages.
European Search Report mailed on Mar. 8, 2016 for application No. 14765497.4. 8 pages.
Notice of Allowance mailed on Nov. 19, 2015 for U.S. Appl. No. 14/475,263, 8 pages.

* cited by examiner

USER DEVICE ENABLING ACCESS TO PAYMENT INFORMATION IN RESPONSE TO MECHANICAL INPUT DETECTION

CROSS-REFERENCE TO RELATED APPLICATIONS

The application claims the benefit of and priority to U.S. Provisional Application No. 62/004,338, filed on May 29, 2014, which is hereby incorporated by reference in its entirety for all purposes.

FIELD OF INVENTION

The present disclosure relates generally to a device with a secure element that detects a mechanical input corresponding to a payment instruction and that transmits payment information in response to the detection.

BACKGROUND

Despite advancements in technology, many retail merchants and customers stand by rather traditional payment methods. When a customer is ready to make a purchase, an employee may identify a total amount due, and the customer may present a credit card. The employee or customer may scan the card, which can cause requested payment details (e.g., an identifier associated with the card and a purchase amount) to be sent to a payment server. Upon receiving an indication from the payment server that the requested payment is authorized, the transaction can be completed.

This typical payment interaction requires a customer to physically possess one or more credit cards. However, routinely carrying and/or locating physical cards may be inconvenient. Some recent innovations rely on use of electronic devices to transmit payment data to a merchant. However, electronic storage of payment data on a network or device and/or infrastructures designed to complete transactions based on such transmission can carry security risks.

SUMMARY

In some embodiments, a computer-implemented method is provided. Payment information for a payment account can be securely stored at a device. The electronic device can detect that a mechanical input was locally received at the electronic device. In response to detecting that the mechanical input has been locally received at the device, access to the payment information can be enabled.

In some embodiments, an electronic device is provided. A user interface can be a configured component to output stimuli and receive inputs. One or more connection components can be configured to transmit communications to other devices. One or more processors can be coupled to the user interface component and the connection component. A computer-readable storage medium can contain instructions, that, when executed by the one or more processors, cause the one or more processors to perform a set of actions. The actions can include securely storing, at the electronic device, payment information for a payment account. The actions can also include detecting, via the user interface, that a mechanical input was locally received at the electronic device. The actions can further include in response to detecting that the mechanical input has been locally received at the device, enabling the payment information to be accessed.

In some embodiments, a computer-program product tangibly embodied in a non-transitory machine-readable storage medium is provided. The computer-program product can include instructions configured to cause one or more data processors to perform a set of actions. The actions can include securely storing payment information for a payment account and detecting that a mechanical input was locally received. The actions can further include, in response to detecting that the mechanical input has been locally received, enabling the payment information to be accessed.

In some embodiments, a system is provided. The system can include an input module for receiving a mechanical input. The system can also include a detection module in communication with the input module for detecting the mechanical user input. The system can further include a security module in communication with the detection module for enabling access of payment information for a payment account in response to the detection of the mechanical input.

The following detailed description together with the accompanying drawings will provide a better understanding of the nature and advantages of the present invention.

DETAILED DESCRIPTION

In certain embodiments of the present invention, an electronic device can include a secure element that detects a mechanical input. The mechanical input can correspond to an instruction to transmit securely stored payment information to another device and/or to release such information to an application on the device (e.g., for use in an in-app commerce transaction). This feature can inhibit or prevent unauthorized transmission of payment information. When the mechanical input is detected, payment information can be transmitted to a point of sale (POS) terminal (e.g., via near-field communication) or released to an app on the device. Further, a user can either use default payment information or interact with the device (before or after providing the mechanical input) to select appropriate payment information for a transaction. For example, the user can select between credit cards, debit cards and/or stored-value cards (e.g., transit card).

Figure 1:
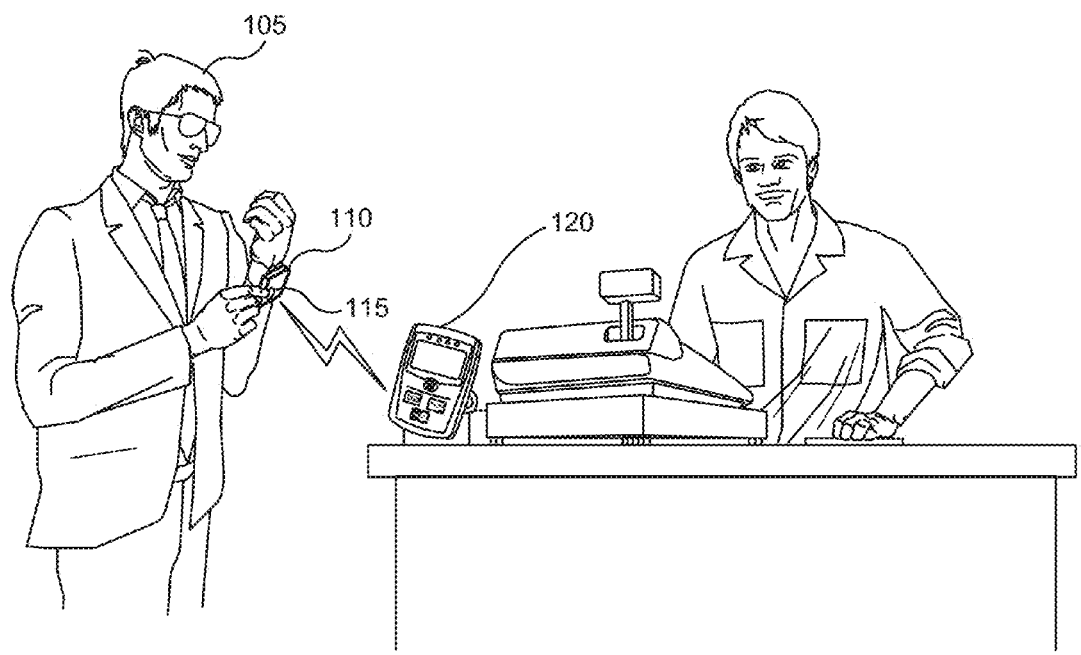
FIG. 1 shows an example of an electronic device communicating with a point of sale (POS) terminal.

FIG. 1 illustrates an example of an electronic device communicating with a point of sale (POS) terminal. In this illustration, a user 105 can use a user device 110 in order to complete a transaction. Payment information can be securely stored on user device 110, and a secure element can conditionally release payment information to be transmitted to another device (or to be used by an app on device 110).

The condition can require that the secure element have detected that a particular mechanical and/or non-virtual input was received at the device. For example, the condition can require a detection that a button 115 on the device was pressed (or pressed a given number of times). In some instances, the condition can also or alternatively require detection of another nearby device. For example, the condition can require that user device 110 be in communication with another device using a near field communication (NFC) channel. The condition can also or alternatively require receipt of a communication from another device (e.g., over an NFC channel) that identifies an amount due. In some instances, the condition can also or alternatively require detection of execution of a commerce app on a device.

User device 110 can identify a payment account to use for a transaction. In some instances, a default account is identified. In some instances, user 105 can provide input to device 110 to select between accounts. Before or after the account identification, user device 110 can detect a POS terminal 120. For example, user 105 or a merchant can position an NFC-compatible user device 110 near an NFC-compatible POS terminal 120, such that user device 110 detects POS terminal 120 using NFC. Upon determining that a transmission condition is satisfied (e.g., having received a mechanical and/or non-virtual input, identified an account and detected a POS terminal), user device 110 can transmit payment information for the identified account (e.g., a credit card number, a checking account number, a gift card number, an expiration date for the card, a security pin for the card and/or a name of a holder of the card) to another device (e.g., using an NFC channel) or release the information to an app on the device. The other device can include a point of sale (POS) terminal 120.

When payment information is transmitted to POS terminal 120, POS terminal 120 can send a payment-request communication to a payment server associated with the account. The payment-request communication can include, for example, some or all of the payment information, a purchase amount, a name of a merchant associated with POS terminal 120, and/or an account number associated with POS terminal 120). The payment server can respond to POS terminal 120 with an indication as to whether the request was authorized. POS terminal 120 may then display a representation of the response. In some instances, POS terminal 120 can cause user device 110 to receive a receipt for the purchase. For example, POS terminal 10 can initiate a purchase, and a payment network server can then transmit receipt data to a transaction-coordination server, which can transmit the receipt data to the user device (e.g., where an app can cause it to be displayed). As another example, the data can be transmitted directly to the device, e.g., using the NFC channel.

Figure 2:
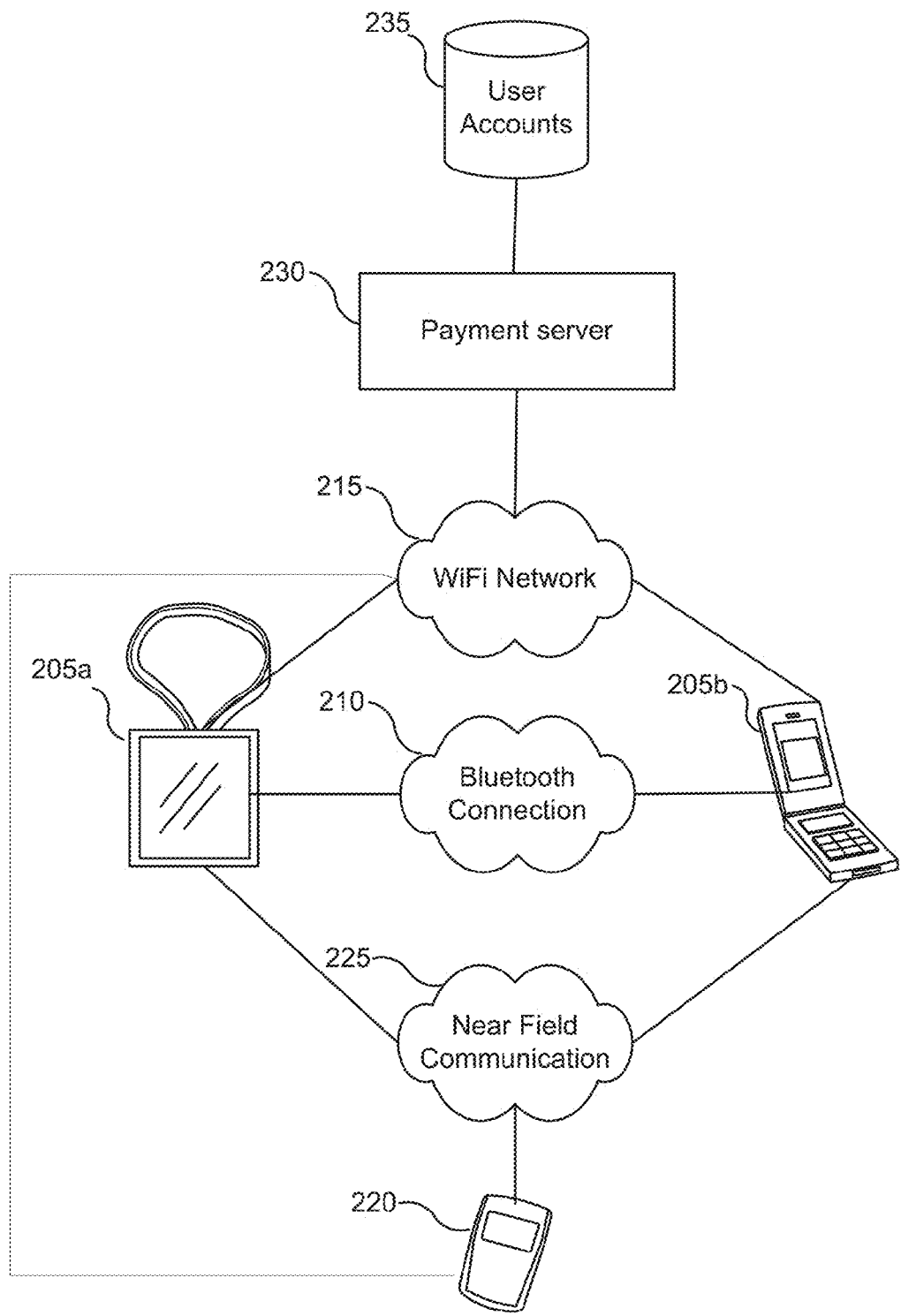
FIG. 2 shows examples of devices connected via one or more communication channels to complete a transaction according to an embodiment of the present invention.

A variety of devices can be involved in a transaction process. FIG. 2 shows examples of devices connected via one or more communication channels to complete a transaction according to an embodiment of the present invention. Exemplary user devices 205 that can detect a particular user input (e.g., which can include detecting a local input, a non-virtual input and/or a mechanical input) and/or conditionally transmit payment information (e.g., using NFC) can include a wearable device 205a (e.g., a necklace, headband, clip, belt, bracelet, watch, pair of glasses, armband, or ear piece) and a phone 205b (e.g., a smart phone). One or more user devices 205 can include or be an NFC-enabled device and/or an inductor.

One or more user devices 205 can store payment information associated with each of one or more payment accounts. Payment account data can include, for example, one or more of: a person's or company's name, a billing address, a login, a password, an account number, an expiration date, a security code, a telephone number, a bank associated with the account (e.g., an issuing bank), and a card network identifier. In some instances, payment account data can include an image, such as a picture of a card (e.g., taken by the device and/or received at the device). In some instances, a user inputs at least some of the payment account data (e.g., entering a credit, debit, account, or gift card number and expiration date). In some instances, at least some payment account data is detected from an image (e.g., of a card). In some instances, at least some payment account data is received from another device (e.g., another user device or a server). For example, payment account data can be received from a server associated with another service for which an account for a user or user device previously made a purchase or identified payment account data (e.g., an app for renting or selling audio and/or video files).

A user can use a user device 205 to add a payment account, such that information for the account will be securely stored on the device. In one instance, after a user initiates such process, information for the account is transmitted to a transaction-coordination server, which then communicates with a server operated by a payment network for the account (e.g., a payment server) to ensure a validity of the entered information. The server can also provide a script that allows payment information for the account to be programmed onto the secure element.

In some instances, communication between user devices 205 can facilitate transactions (e.g., generally or specific transactions). For example, one user device (e.g., phone 205b) can serve as a provisioning or managing device, and can send notifications of new or updated payment account data (e.g., information for a new account, updated information for an existing account, and/or an alert pertaining to an existing account). As another example, a first user device can send data to a second user device reflecting information about payment transactions facilitated at the first user device. The information can include, e.g., a payment amount, an account used, a time of purchase and/or whether a default account was changed. Such information can be used at the second device to, for example, update a default account (e.g., based on a learning algorithm or explicit user input).

User devices 205 can communicate with each other over any of a variety of networks. For example, the devices can communicate using a Bluetooth connection 210 (e.g., which can include a traditional Bluetooth connection or a Bluetooth Low Energy connection) or using a WiFi network 215. Communications between user devices can be conditioned to reduce the possibility of inappropriately sharing information across devices. For example, communications relating to payment information can require that the communicating devices be paired (e.g., being associated with each via an explicit user interaction) or be associated with a same user account.

A user device 205 can be used to communicate with a POS terminal 220, which can include or be an NFC-enabled device (and/or can include an inductor). The communication can occur using a variety of communication channels and/or technologies. In one instance, user device 205 communicates with POS terminal 220 using an NFC channel 225. In some instances, POS terminal 220 can communicate with a user device 205 using a peer-to-peer NFC mode. User device 205 can transmit a signal to POS terminal 220 that includes payment information for a payment account (e.g., a default account or one selected by the user for the particular transaction).

In some instances, generation of and/or transmission of the signal can be controlled by a secure element in user device 205. The secure element can require a particular user input prior to releasing payment information. For example, the secure element can require detection that the device is being worn, detection of a button press, detection of entry of a passcode, detection of a touch, a detection of one or more option selections (e.g., made while interacting with an app), a detection of a biometric input (e.g., a fingerprint signature or voice signature), a detection of a voice command and/or a detection of a gesture or movement (e.g., rotation or acceleration). If a communication channel (e.g., an NFC communication channel) with another device (e.g., POS terminal 220) is established within a defined time period from detection of the input, the secure element may release payment information to be transmitted to the other device.

In some instances, protocols related to transaction participation depend on, for example, device types. For example, a condition for generating and/or transmitting payment information can be different for wearable device 205a and phone 205b. To illustrate, a generation and/or transmission condition for wearable device 205a can include detecting that a button has been pressed, while a corresponding condition need not require button-depression selection and instead can require detection of particular interaction with an app. In one instance, a condition for transmitting and/or releasing payment information includes receiving particular input on each of multiple devices. For example, release of payment information on device 205a may require detection of a fingerprint and/or passcode on device 205b and detection of a mechanical input (e.g., button press) on device 205a.

POS terminal 220 can use the payment information to generate a signal to transmit to a payment server 230 to determine whether the payment is authorized. Payment server 230 can include any device or system configured to receive payment information associated with a payment account and to determine whether a proposed purchase is authorized. In some instances, payment server 230 includes a server of an issuing bank. POS terminal 220 can communicate with payment server 230 directly or indirectly via one or more other devices or systems (e.g., a server of an acquiring bank and/or a server of a card network).

Payment server 230 can use at least some of the payment information to identify a user account. For example, each user account can include payment information. An account can be located by, e.g., locating an account with particular payment information matching that from the POS communication. In some instances, a payment can be denied when provided payment information is not consistent (e.g., an expiration date does not correspond to a credit, debit or gift card number) or when no account includes payment information matching that from the communication.

Data for the user account can further identify, for example, one or more restrictions (e.g., credit limits); current or previous balances; previous transaction dates, locations and/or amounts; account status (e.g., active or frozen) and/or authorization instructions. In some instances, such data can be used to determine whether to authorize a payment. For example, a payment server can deny a payment when an a purchase amount added to a current balance would result in exceeding an account limit, when an account is frozen, when a previous transaction amount exceeds a threshold, or when a previous transaction count or frequency exceeds a threshold.

Payment server 230 can respond to POS terminal 220 with an indication as to whether a proposed purchase is authorized or denied. In some instances, POS terminal 220 can transmits a signal to user device 205 to identify the result. For example, POS terminal 220 can send a receipt to user device 205 when a purchase is authorized (e.g., via a transaction-coordination server that manages a transaction app on the user device). In some instances, POS terminal 220 presents an output (e.g., a visual or audio output) indicative of the result. Payment can be sent to the merchant as part of the authorization process or can be subsequently sent.

It will be appreciated that, in some instances, user device 205 participates in a transaction that is completed without involvement of POS terminal 220. For example, upon detecting that a mechanical input has been received, a secure element in user device 205 can release payment information to allow an app on the device to access the information (e.g., and to transmit it to a server associated with the app).

Figure 3A:
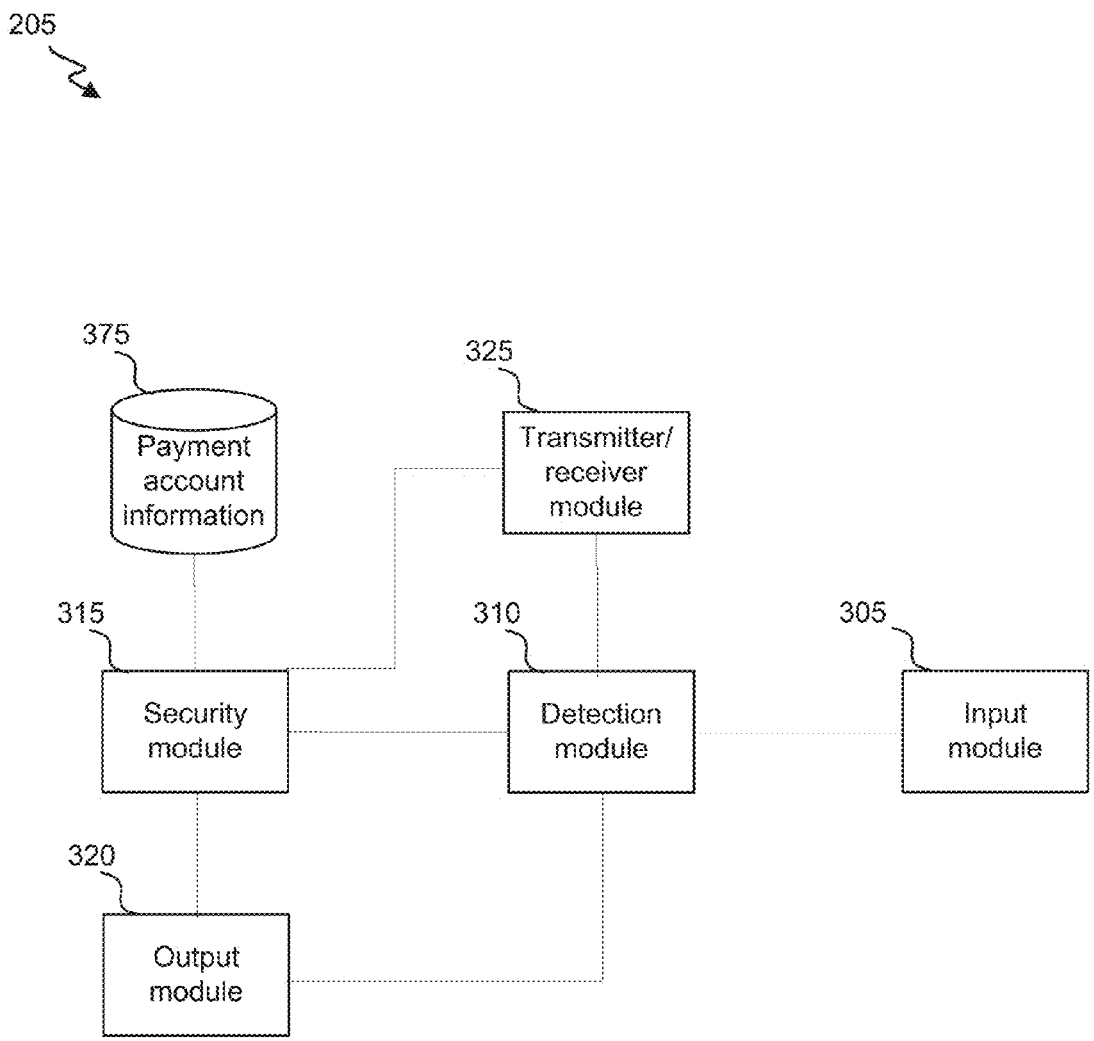
FIGS. 3A and 3B show a block diagram of a user device according to an embodiment of the invention.

FIG. 3A shows a block diagram of a user device 205 according to an embodiment of the invention. User device 205 can include an input module 305 for receiving a mechanical input. Input module 305 can include, for example, a button, switch or touchscreen.

User device 205 can also include a detection module 310 for detecting the mechanical input. In some instances, detection module 310 further detects a non-mechanical input, such as a virtual input received via a touchscreen, an audio input received via a microphone or a gesture as detected by one or more sensors (e.g., an accelerometer and/or gyroscope).

User device 205 can further include a security module for conditionally enabling access of payment information for a payment account in response to the detection of the mechanical input. The access can be enabled upon detecting the mechanical input (e.g., alone or in a concurrent or sequential detection of another type of input, such as a virtual input).

In some instances, enabling access of payment information includes retrieving the payment information from a local payment account information data store 375. Payment account information data store 375 can include information pertaining to one or more payment accounts (e.g., a bank account, online payment account, loyalty card, and/or credit card). The information can include, for example, a card or account number. The payment information can be securely stored, such that the information cannot be received without, e.g., receipt of a key, password or particular information-releasing instruction. In one instance, at least some of the payment information is encrypted, and enabling access of the payment information includes decrypting the information.

In some instances, payment account information data store 375 includes payment information for multiple accounts. Security module 315 can then enable access to payment information for a select one or an incomplete subset of the multiple accounts. The selection can be based on, for example, a default account setting, a learning algorithm that detects account usage patterns (e.g., to detect which account has been frequently used generally, recently and/or in specific contexts such as spatial or temporal contexts) and/or a user selection.

In some instances, user device 205 includes an output module 320 for presenting a representation of each of one or more payment accounts (e.g., being, including or identifying a default payment account). Input module 305 can receive any user input that corresponds to a selection of a payment account to use for a transaction (e.g., instead of the default payment account). For example, an identification of each of multiple accounts can be presented on a touchscreen, and a user can select an account by touching the representation.

User device 205 can also include a transmitter/receiver module 325. Transmitter/receiver module 325 can transmit a communication, via a connection component (e.g., an inductor), to a POS terminal. The communication can include the payment information and can be wirelessly transmitted (e.g., using NFC).

Transmitter/receiver module 325 can also be involved in a provisioning process. For example, user device 205 can exchange unique device identifiers with another device (e.g., another device associated with a same user and/or user account). User device 205 can store the identifier of the other device. Transmitter/receiver module 325 can receive a communication from the other device that includes some or all of the payment information (which can include updated payment information) for which security module 315 enables access. The communication can include the unique identifier of the other device, such that the security module can verify that the identifier in the communication matches the stored identifier.

Figure 3B:
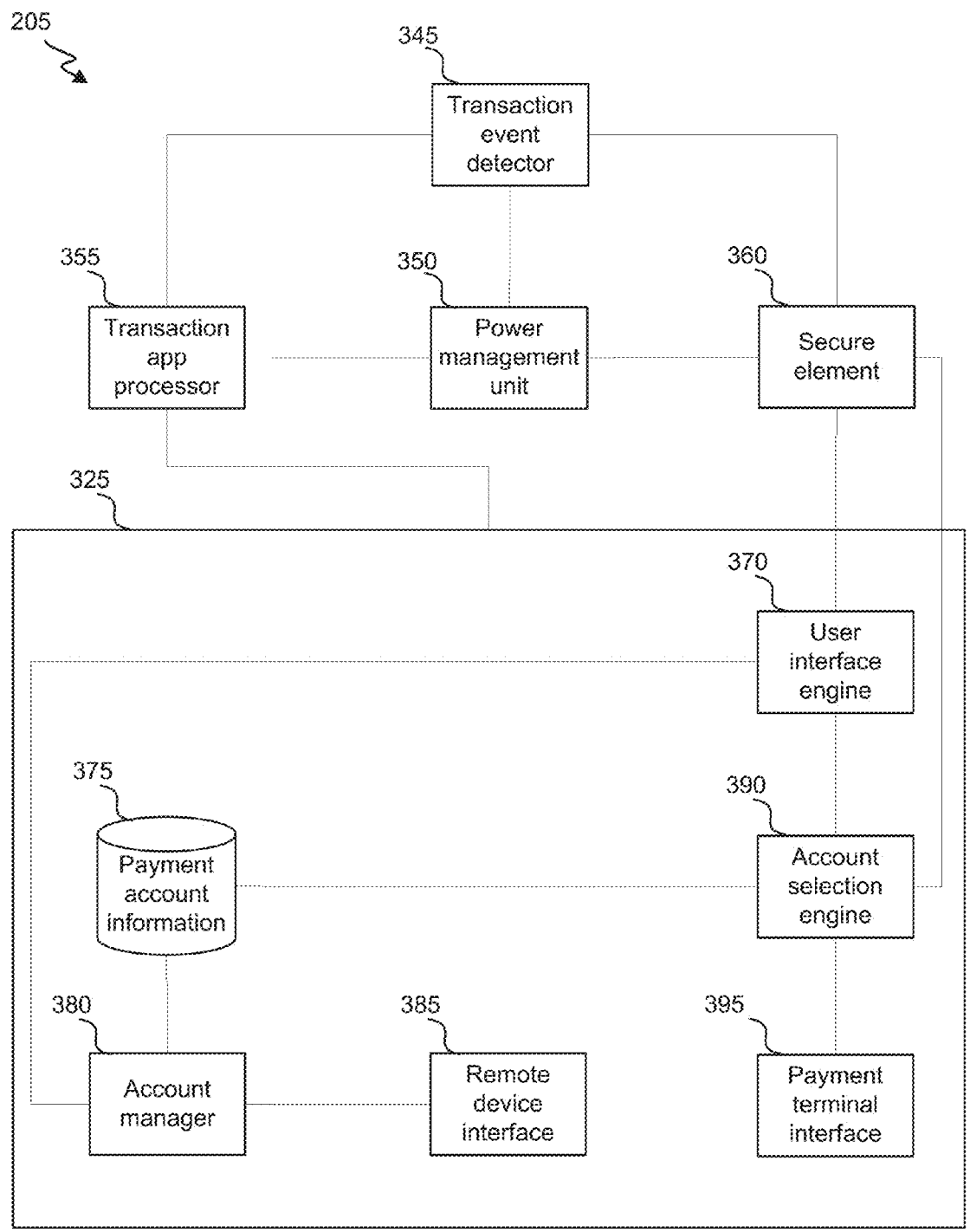

FIG. 3B shows a block diagram of a user device 205 according to an embodiment of the invention. User device 205 can include a transaction event detector 345 that detects a transaction-initiating event, such as an input, sensor reading or signal that corresponds to a payment process. For example, transaction event detector 345 can detect one or more depressions of a particular button, a particular gesture, a particular voice command, a signal from a POS terminal, and/or a signal with a request for payment information. In some instances, detecting the transaction-initiating event includes detecting a biometric input, such as a fingerprint or voice (e.g., in addition to or independently of a mechanical input).

Upon detecting the transaction event, transaction event detector 345 can trigger a power management unit 350 to determine whether a transaction app processor 355 is powered on. If app processor 355 is powered on, power management unit 350 can maintain current power operations involving transaction app processor 355 and secure element 360.

If power management unit 350 determines that power is not being supplied to app processor 355, it can power up app processor 355. Power management unit 350 can further assert a line (if one is not already asserted) between transaction app processor 355 and a secure element 360. Transaction app processor 355 can subsequently execute a process to receive notifications of particular input types (e.g., mechanical inputs, button-press inputs, or presses of a particular button), which can result in app processor 355 calling secure element 360 over the line. The call can cause secure element 360 to receive power and to realize the line.

Transaction app processor 355 and/or secure element 360 can be configured to run one or more processes operated by a transaction control unit 365. A user interface engine 370 can monitor inputs received by user device 205 and/or can control outputs presented by user device 205. For example, user interface engine 370 can detect when a user touches a touch screen, where on a screen a touch occurred, and/or whether a particular button was pressed (e.g., based on whether a corresponding switch was activated). In some instances, user interface engine 370 detects sensor data indicative of user interactions. For example, user interface engine 370 can detect a voice command using a speaker or a gesture using an accelerometer and/or gyroscope.

When a particular input is received, secure element 360 can determine that payment information can be released. However, the information that is released and/or transmitted to another device can be limited, e.g., to information associated with a selected account. Specifically, user device 205 can include payment account information data store 375 that stores payment information for each of one or more accounts. In one instance, access to data in payment account information data store 375 is controlled by secure element 360, and/or payment account information data store 375 is part of secure element 360. The payment information can be securely stored, such that the information cannot be received without, e.g., receipt of a key, password or particular information-releasing instruction. In one instance, at least some of the payment information is encrypted, and decryption is performed upon determining that payment information can be released.

An account manager 380 can manage payment account information data store 375 by, e.g., adding payment information for one or more new accounts, removing payment information for one or more accounts, modifying payment information for one or more accounts; adding or modifying device- or user-specific selection details; adding or modifying account-associated restriction or reward information; and/or adding or modifying usage data. For example, payment information for an account can include one or more of: a person's or company's name, a billing address, a login, a password, an account number, an expiration date, a security code, a telephone number, a bank associated with the account (e.g., an issuing bank), and a card network identifier. Adding or modifying account data can include sending new account data to a transaction-coordination server, which can communicate with a payment server for the account. The payment server can verify accuracy of the new account data and/or can provide a script to securely store the account data on a secure element of the device. In some instances, payment account data can include an image, such as a picture and/or graphical representation of a card (e.g., taken by the device and/or received at the device). A graphical representation of a card can include a simplified representation of a card that omits, for example, an expiration date, full account number, card-holder name and security pin. Remaining represented data can nonetheless allow for identification of the corresponding account (e.g., by providing a graphic of an associated network). Selection details can include, e.g., an identification of a default account, a condition indicating when a particular account is to be selected, or a condition indicating when a particular account is not to be selected.

Restriction or reward information can include, for example, a credit limit, a value of a reward scheme (e.g., a number of points earned per dollar of purchase generally or at a specific merchant), or a type of unallowed purchase. Usage information can include, for each of one or more purchases, a time of the purchase, a merchant associated with the purchase, a location of a device at the time of purchase, a merchant location, an amount of the purchase, and/or an account used for the purchase.

Account manager 380 can determine whether and/or how to update data store 375 based on a communication received from another device (e.g., via a remote device interface 385) and/or based on input from a user. For example, remote device interface 385 can receive a communication from a paired device indicating that a user has associated a new payment account with a user account. As another example, remote device interface 385 can receive a communication from a POS terminal indicating that a particular payment account is no longer active. As another example, a transaction-coordination server can receive information from a payment network server that an account is no longer valid or is overdrawn, and the transaction-coordination server can then communicate the information to one or more user devices associated with the account. As yet another example, remote device interface 385 can receive a communication from a paired device that indicates that a particular payment account is nearing its limit (e.g., based on tracking of spending or communication with a POS terminal). As still another example, account manager 380 can receive an indication from user interface engine 370 that a user entered input identifying a new payment account. Restriction or reward information and/or usage information can similarly be based on a communication received from another device (e.g., another user device or a POS server) and/or based on input from a user.

Selection details can similarly be based on a communication received from another device (e.g., via a remote device interface 385) and/or based on input from a user. Alternatively or additionally, a selection detail can be determined based on a learning technique. For example, account manager 380 can identify an account most frequently used (or selected) for payments within a defined recent time period. As another example, account manager 380 can identify an account most frequently used or selected for payments associated with a particular merchant and/or at a particular geographic location (which can include a geographic region and/or can be defined using one or more geographic coordinates). The learning technique can be based on data from payments made locally at device 205 and/or based on data characterizing payments made at one or more other devices.

When multiple payment accounts are represented in payment account information data store 375, an account selection engine 390 can select between the accounts. The selection can be based on stored payment information, stored selection details, stored usage information, stored restriction or reward information and/or a selection protocol. For example, a protocol can include selecting an account used (generally or at user device 205) for a most-recent purchase. As another example, a protocol can include selecting an account with a highest award value per dollar (generally or for a particular purchase). As another example, a protocol can restrain from selecting an account when it is within a threshold amount from a limit, when a purchase would push the account to within a threshold amount from a limit or when a purchase would cause the limit to be exceeded. As yet another example, a protocol can include selecting an account identified as being a default account (e.g., which can be set as a default account by a user, another device, a payment network for the account, an issuing bank for the account, or a POS terminal).

In some instances, the account selection performed by account selection engine 390 includes an initial selection. Account selection engine 390 can then cause user interface engine 370 to provide an identification of the initially selected account (e.g., by visually displaying an image representative of the account or a representation of a pass for the account). Such presentation can be accompanied with an opportunity for a user to change the account selected. For example, a presentation can be configured such that a user can slide a finger across a screen to view other account representations and, when a representation of an account of interest is shown, the user can select an option to use a select the account (e.g., by pressing a physical button or an option on the screen or by keeping a representation of the account on a screen). In one instance, a lack of additional input received after the identification of the initially selected account confirms the initial selection. In one instance, a user input corresponding to a confirmation of the initial selection is required.

Account selection engine 390 can then retrieve payment information for the selected account from payment account information data store 375. The retrieved payment information can include some or all of that associated with a selected account. Secure element 360 can condition this retrieval and/or transmission of the account information upon detection that a particular payment-authorizing input has been received at device 205. For example, secure element 360 can prevent payment information from being retrieved or transmission unless it detects that a user pressed a particular non-virtual (e.g., once, twice or another defined number of times). Upon determining that payment-authorizing input has been received at device 205, secure element 360 can enable payment information to be retrieved and/or transmitted for up to a defined period of time.

A payment terminal interface 395 can then generate a signal that includes the selected payment information and transmit the signal. Payment terminal interface 395 can be configured to communicate with a nearby device over a short-range and/or near-field communication channel. For example, payment terminal interface 395 can be configured to transmit the signal using NFC.

In some instances, payment terminal interface 395 is further configured to receive one or more signals from another (e.g., nearby or remote) device. A received signal can, for example, identify an amount due, identify a result of an authorization request, and/or include a receipt. For example, payment terminal interface 395 may first receive a signal identifying an amount due. This signal may cause account selection engine 390 to select an account for payment and/or secure element 360 to determine whether to enable the selection and/or transmission of payment information (e.g., based on whether particular input has been received). When transmission of payment information is allowed, payment terminal interface 395 can transmit the payment information to the other device.

While user device 205 depicted in FIG. 3 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software. It is also not required that every block in FIG. 3 be implemented in a given embodiment of an electronic device disclosed herein (e.g., a coordinating device or wearable device).

Figure 4:
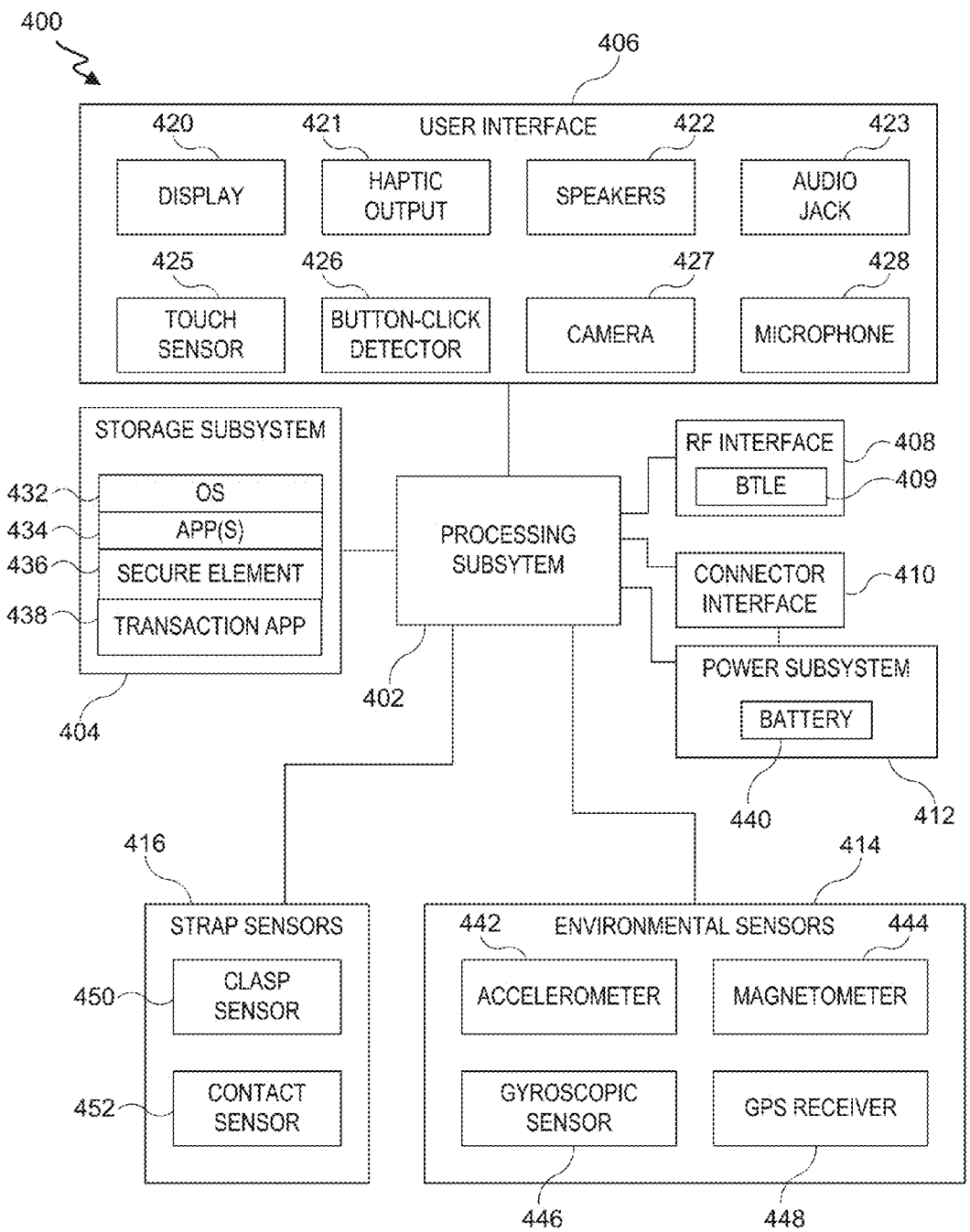
FIG. 4 is a simplified block diagram of a user device according to an embodiment of the present invention.

As noted above, in some instances, user device 205 can be a wearable device (e.g., device 205*a*). FIG. 4 is a simplified block diagram of a wearable device 400 according to an embodiment of the present invention. Wearable device 400 can include processing subsystem 402, storage subsystem 404, user interface 406, one or more connection components (e.g., RF interface 408 and/or connector interface 410), power subsystem 412, environmental sensors 414, and strap sensors 416. Wearable device 400 can also include other components (not explicitly shown).

Storage subsystem 404 can be implemented, e.g., using magnetic storage media, flash memory, other semiconductor memory (e.g., DRAM, SRAM), or any other non-transitory storage medium, or a combination of media, and can include volatile and/or non-volatile media. In some embodiments, storage subsystem 404 can store media items such as audio files, video files, image or artwork files; information about a user's contacts (names, addresses, phone numbers, etc.); information about game-performance assessments and/or games that a user previously participated in; information about a user's scheduled games, appointments and events; notes; and/or other types of information, examples of which are described below. In some embodiments, storage subsystem 404 can also store one or more application programs (or apps) 434 to be executed by processing subsystem 402 (e.g., video game programs, personal information management programs, media playback programs, interface programs associated with particular host devices and/or host device functionalities, etc.).

In some embodiments, storage subsystem 404 can store payment-account data. The payment-account data can include, for example, payment information for each of one or more payment accounts; data related to a protocol for selecting between payment accounts, restriction or reward information for each of one or more accounts, and/or usage data for each of one or more accounts. Part or all of the data stored in storage subsystem 404 can be securely stored and/or encrypted. In one instance, at least part of storage subsystem 404 resides at and/or is controlled by a secure element.

User interface 406 can include any combination of input and output devices. A user can operate input devices of user interface 406 to invoke the functionality of wearable device 400 and can view, hear, and/or otherwise experience output from wearable device 400 via output devices of user interface 406.

Examples of output devices include display 420, haptic output generator 421 and speakers 422. Display 420 can be implemented using compact display technologies, e.g., LCD (liquid crystal display), LED (light-emitting diode), OLED (organic light-emitting diode), or the like. In some embodiments, display 420 can incorporate a flexible display element or curved-glass display element, allowing wearable device 400 to conform to a desired shape. One or more speakers 421 can be provided using small-form-factor speaker technologies, including any technology capable of converting electronic signals into audible sound waves. In some embodiments, speakers 421 can be used to produce tones (e.g., beeping or ringing) and can but need not be capable of reproducing sounds such as speech or music with any particular degree of fidelity. Haptic output generator 422 can be, e.g., a device that converts electronic signals into vibrations; in some embodiments, the vibrations can be strong enough to be felt by a user wearing wearable device 400 but not so strong as to produce distinct sounds.

Examples of input devices include touch sensor 425, button-click detector 426, camera 427 and microphone 428. Touch sensor 425 can include, e.g., a capacitive sensor array with the ability to localize contacts to a particular point or region on the surface of the sensor and in some instances, the ability to distinguish multiple simultaneous contacts. In some embodiments, touch sensor 425 can be overlaid over display 420 to provide a touchscreen interface, and processing subsystem 404 can translate touch events (including taps and/or other gestures made with one or more contacts) into specific user inputs depending on what is currently displayed on display 420.

Button-click detector 426 can detect a click and/or depression of a button. For example, a click can be detected when an element underneath a button contacts an underlying device component to complete a circuit or when the depression of the button causes a switch to be activated or unactivated. In some instances, button-click detector 426 can detect a click and/or depression for each of a plurality of buttons and can identify which one was clicked.

Camera 427 can include, e.g., a compact digital camera that includes an image sensor such as a CMOS sensor and optical components (e.g. lenses) arranged to focus an image onto the image sensor, along with control logic operable to use the imaging components to capture and store still and/or video images. Images can be stored, e.g., in storage subsystem 404 and/or transmitted by wearable device 400 to other devices for storage. Depending on implementation, the optical components can provide fixed focal distance or variable focal distance; in the latter case, autofocus can be provided. In some embodiments, camera 427 can be disposed along an edge of a face member of a device, e.g., the top edge, and oriented to allow a user to capture images of nearby objects in the environment such as a bar code or QR code. In other embodiments, camera 427 can be disposed on the front surface of a device face member, e.g., to capture images of the user. Zero, one, or more cameras can be provided, depending on implementation.

Microphone 428 can include any device that converts sound waves into electronic signals. In some embodiments, microphone 428 can be sufficiently sensitive to provide a representation of specific words spoken by a user; in other embodiments, microphone 428 can be usable to provide indications of general ambient sound levels without necessarily providing a high-quality electronic representation of specific sounds.

In some embodiments, user interface 406 can provide output to and/or receive input from an auxiliary device such as a headset. For example, audio jack 423 can connect via an audio cable (e.g., a standard 2.5-mm or 3.5-mm audio cable) to an auxiliary device. Audio jack 423 can include input and/or output paths. Accordingly, audio jack 423 can provide audio to the auxiliary device and/or receive audio from the auxiliary device. In some embodiments, a wireless connection interface can be used to communicate with an auxiliary device.

Processing subsystem 402 can be implemented as one or more integrated circuits, e.g., one or more single-core or multi-core microprocessors or microcontrollers, examples of which are known in the art. In operation, processing system 402 can control the operation of wearable device 400. In various embodiments, processing subsystem 404 can execute a variety of programs in response to program code and can maintain multiple concurrently executing programs or processes. At any given time, some or all of the program code to be executed can be resident in processing subsystem 404 and/or in storage media such as storage subsystem 404.

Through suitable programming, processing subsystem 402 can provide various functionality for wearable device 400. For example, in some embodiments, processing subsystem 402 can execute an operating system (OS) 432 and various applications 434 such as a phone-interface application, a text-message-interface application, a media interface application, a fitness application, and/or other applications. In some embodiments, some or all of these application programs can interact with a host device, e.g., by generating messages to be sent to the host device and/or by receiving and interpreting messages from the host device. In some embodiments, some or all of the application programs can operate locally to wearable device 400. For example, if wearable device 400 has a local media library stored in storage subsystem 404, a media interface application can provide a user interface to select and play locally stored media items.

Processing subsystem 402 can also execute a code for one or more components of device 400. For example, processing subsystem 402 can execute a secure element code 436 (which can be part of OS 432 or separate as desired). Execution of secure element code 436 can control the release of payment information from a secure storage. For example, execution of secure element code 436 can result in monitoring for receipt of a particular input as the device, such as monitoring to determine whether a button has been mechanically pressed. Upon determining that the particular input was received and/or that another condition is satisfied, at least some payment information can be released for use by an app on the device and/or made available for transmission (e.g., by decrypting the payment information).

Processing subsystem 438 can also or alternatively execute a transaction app code 438, which can result in, for example, selection of a payment account, coordination with a secure element to retrieve payment information for the payment account, generating and transmitting a signal to a payment terminal with the payment information, and/or receiving and processing of a signal from a payment terminal.

Processing subsystem 438 can also or alternatively execute code for one or more components of user device 205 depicted in FIG. 3.

RF (radio frequency) interface 408 can allow wearable device 400 to communicate wirelessly with various devices (e.g., a payment terminal, server or other user device). RF interface 408 can include RF transceiver components such as an antenna and supporting circuitry to enable data communication over a wireless medium, e.g., using Wi-Fi (IEEE 802.11 family standards), Bluetooth® (a family of standards promulgated by Bluetooth SIG, Inc.), or other protocols for wireless data communication. In some embodiments, RF interface 408 can implement a Bluetooth LE (Low energy) proximity sensor 409 that supports proximity detection through an estimation of signal strength and/or other protocols for determining proximity to another electronic device.

In some embodiments, RF interface 408 can provide near-field communication ("NFC") capability, e.g., implementing the ISO/IEC 18092 standards or the like; NFC can support wireless data exchange between devices over a very short range (e.g., 20 centimeters or less). RF interface 408 can be implemented using a combination of hardware (e.g., driver circuits, antennas, modulators/demodulators, encoders/decoders, and other analog and/or digital signal processing circuits) and software components. Multiple different wireless communication protocols and associated hardware can be incorporated into RF interface 408.

Connector interface 410 can allow wearable device 400 to communicate with various devices (e.g., a server or coordinating device) via a wired communication path, e.g., using Universal Serial Bus (USB), universal asynchronous receiver/transmitter (UART), or other protocols for wired data communication. In some embodiments, connector interface 410 can provide a power port, allowing wearable device 400 to receive power, e.g., to charge an internal battery. For example, connector interface 410 can include a connector such as a mini-USB connector or a custom connector, as well as supporting circuitry. In some embodiments, a device can be powered or charged via inductive charging. In some embodiments, the connector can be a custom connector that provides dedicated power and ground contacts, as well as digital data contacts that can be used to implement different communication technologies in parallel; for instance, two pins can be assigned as USB data pins (D+ and D−) and two other pins can be assigned as serial transmit/receive pins (e.g., implementing a UART interface). The assignment of pins to particular communication technologies can be hardwired or negotiated while the connection is being established. In some embodiments, the connector can also provide connections for audio and/or video signals, which can be transmitted to or from another device in analog and/or digital formats.

In some embodiments, connector interface 410 and/or RF interface 408 can be used to support synchronization operations in which data is transferred from a another device (e.g., a payment terminal, server or other user device) to wearable device 400 (or vice versa). For example, a user can be able to customize settings and other information for wearable device 400. While user interface 406 can support data-entry operations, a user can find it more convenient to define customized information on a separate device (e.g., a tablet or smartphone) that has a larger interface (e.g., including a real or virtual alphanumeric keyboard), then transfer the customized information to wearable device 400 via a synchronization operation. Synchronization operations can also be used to load and/or update other types of data in storage subsystem 404, such as media items, application programs, personal data, and/or operating system programs. Synchronization operations can be performed in response to an explicit user request and/or automatically, e.g., when wireless device 400 resumes communication with a particular host device or in response to either device receiving an update to its copy of synchronized information.

Environmental sensors 414 can include various electronic, mechanical, electromechanical, optical, or other devices that provide information related to external conditions around wearable device 400. Sensors 414 in some embodiments can provide digital signals to processing subsystem 402, e.g., on a streaming basis or in response to polling by processing subsystem 402 as desired. Any type and combination of environmental sensors can be used; shown by way of example are accelerometer 442, a magnetometer 444, a gyroscope 446, and a GPS receiver 448.

Some environmental sensors can provide information about the location and/or motion of wearable device 400. For example, accelerometer 442 can sense acceleration (relative to freefall) along one or more axes, e.g., using piezoelectric or other components in conjunction with associated electronics to produce a signal. Magnetometer 444 can sense an ambient magnetic field (e.g., Earth's magnetic field) and generate a corresponding electrical signal, which can be interpreted as a compass direction. Gyroscopic sensor 446 can sense rotational motion in one or more directions, e.g., using one or more MEMS (micro-electro-mechanical systems) gyroscopes and related control and sensing circuitry. Global Positioning System (GPS) receiver 448 can determine location based on signals received from GPS satellites. In some instances, data detected from one or more environmental sensors can be used to identify a gesture indicative of particular input. For example, rather than using a touchscreen to select a notification action and/or dismiss an alert or notification, this information can be conveyed by a particular arm movement.

Other sensors can also be included in addition to or instead of these examples. For example, a sound sensor can incorporate microphone 426 together with associated circuitry and/or program code to determine, e.g., a decibel level of ambient sound. Temperature sensors, proximity sensors, ambient light sensors, or the like can also be included.

Strap sensors 416 can include various electronic, mechanical, electromechanical, optical, or other devices that provide information as to whether wearable device 400 is currently being worn. In some embodiments, certain features of wearable device 400 can be selectively enabled or disabled depending on whether wearable device 400 is currently being worn Power subsystem 412 can provide power and power management capabilities for wearable device 400. For example, power subsystem 412 can include a battery 440 (e.g., a rechargeable battery) and associated circuitry to distribute power from battery 440 to other components of wearable device 400 that require electrical power. In some embodiments, power subsystem 412 can also include circuitry operable to charge battery 440, e.g., when connector interface 410 is connected to a power source. In some embodiments, power subsystem 412 can include a "wireless" charger, such as an inductive charger, to charge battery 440 without relying on connector interface 410. In some embodiments, power subsystem 412 can also include other power sources, such as a solar cell, in addition to or instead of battery 440.

In some embodiments, power subsystem 412 can control power distribution to components within wearable device 400 to manage power consumption efficiently. For example, power subsystem 412 can automatically place device 400 into a "hibernation" state when strap sensors 416 or other sensors indicate that device 400 is not being worn. The hibernation state can be designed to reduce power consumption; accordingly, user interface 406 (or components thereof), RF interface 408, connector interface 410, and/or environmental sensors 414 can be powered down (e.g., to a low-power state or turned off entirely), while strap sensors 416 are powered up (either continuously or at intervals) to detect when a user puts on wearable device 400. As another example, in some embodiments, while wearable device 400 is being worn, power subsystem 412 can turn display 420 and/or other components on or off depending on motion and/or orientation of wearable device 400 detected by environmental sensors 414.

Power subsystem 412 can also provide other power management capabilities, such as regulating power consumption of other components of wearable device 400 based on the source and amount of available power, monitoring stored power in battery 440, generating user alerts if the stored power drops below a minimum level, and so on.

In some embodiments, control functions of power subsystem 412 can be implemented using programmable or controllable circuits operating in response to control signals generated by processing subsystem 402 in response to program code executing thereon, or as a separate microprocessor or microcontroller. In some embodiments, control functions of power subsystem 412 can be based on user interaction with the device (e.g., to power down components if a device has not been interacted with in a particular manner, such as via a touch, button press or network activity, for a defined period of time).

It will be appreciated that wearable device 400 is illustrative and that variations and modifications are possible. For example, strap sensors 416 can be modified, and wearable device 400 can include a user-operable control (e.g., a button or switch) that the user can operate to provide input. Controls can also be provided, e.g., to turn on or off display 420, mute or unmute sounds from speakers 422, etc. Wearable device 400 can include any types and combination of sensors and in some instances can include multiple sensors of a given type.

In various embodiments, a user interface can include any combination of any or all of the components described above, as well as other components not expressly described. For example, in some embodiments, the user interface can include, e.g., just a touchscreen, or a touchscreen and a speaker, or a touchscreen and a haptic device. Where the wearable device has an RF interface, a connector interface can be omitted, and all communication between the wearable device and other devices can be conducted using wireless communication protocols. A wired power connection, e.g., for charging a battery of the wearable device, can be provided separately from any data connection.

Further, while the wearable device is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software. It is also not required that every block in FIG. 4 be implemented in a given embodiment of a wearable device.

In one instance, wearable device 400 can be implemented as a non-wearable user device. For example, wearable device 400 can lack strap sensors 416.

Figure 5:
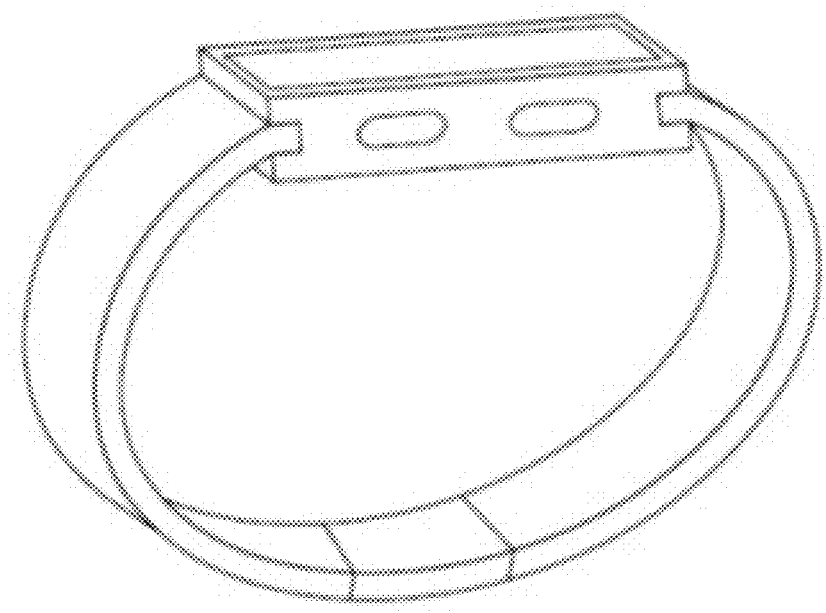
FIG. 5 shows an example of an electronic device according to an embodiment of the present invention.

Embodiments described herein may take the form of, be incorporated in, or operate with a suitable electronic device. One example of such a device is shown in FIG. 5 and takes the form of a wearable mechanism. As shown, the mechanism may be worn on a user's wrist and secured thereto by a band. The mechanism may have a variety of functions including, but not limited to: keeping time; monitoring a user's physiological signals and providing health-related information based on those signals; communicating (in a wired or wireless fashion) with other electronic devices, which may be different types of devices having different functionalities; providing alerts to a user, which may include audio, haptic, visual and/or other sensory output, any or all of which may be synchronized with one another; visually depicting data on a display; gather data form one or more sensors that may be used to initiate, control, or modify operations of the device; determine a location of a touch on a surface of the device and/or an amount of force exerted on the device, and use either or both as input; accepting voice input to control one or more functions; accepting tactile input to control one or more functions; and so on.

Alternative embodiments of suitable electronic devices include a phone; a tablet computing device; a portable media player; and so on. Still other suitable electronic devices may include laptop/notebook computers, personal digital assistants, touch screens, input-sensitive pads or surfaces, and so on.

Figure 6:
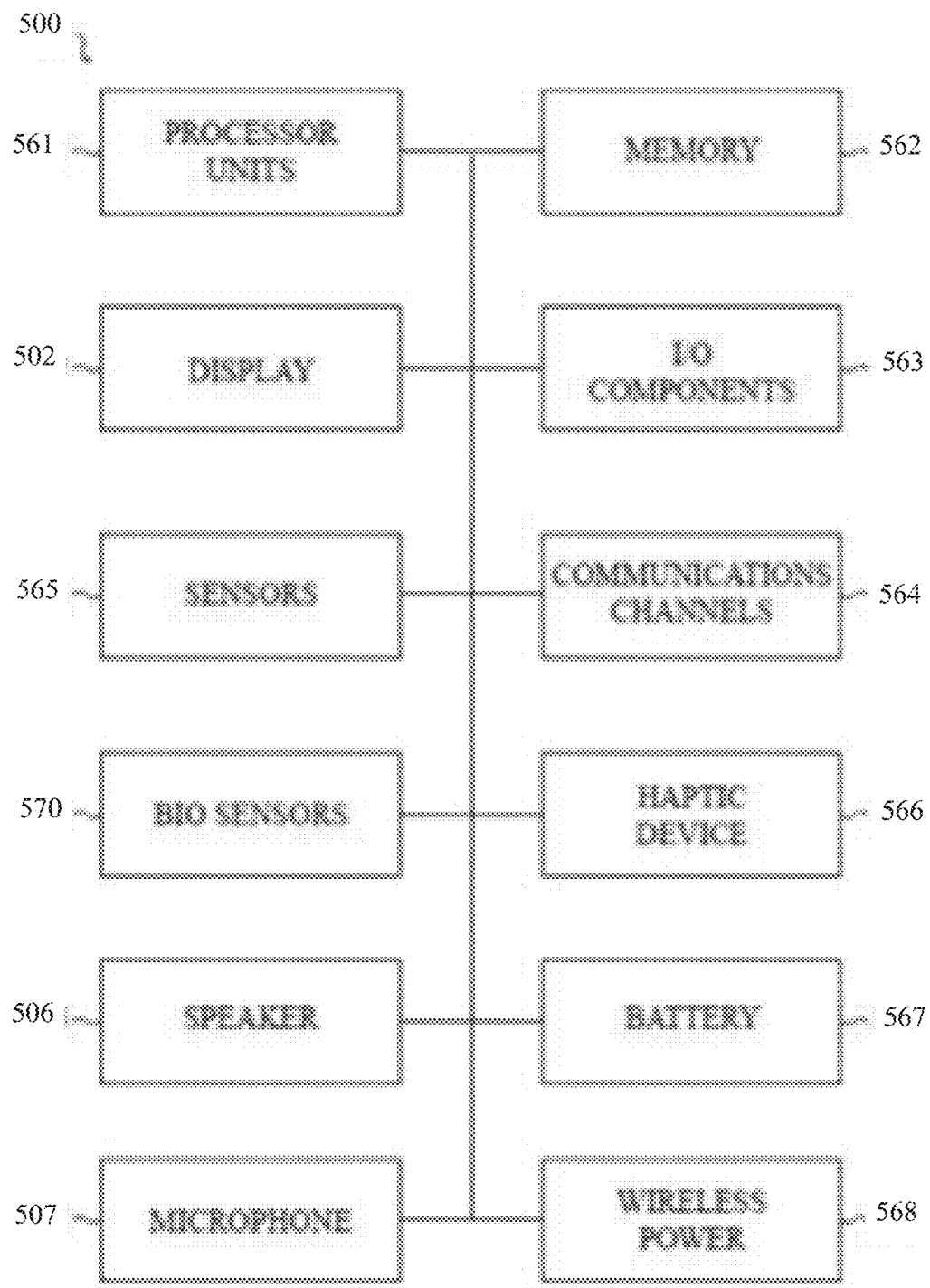
FIG. 6 depicts an example schematic diagram of a wearable electronic device according to an embodiment of the present invention.

FIG. 6 depicts an example schematic diagram of a wearable electronic device. As shown in FIG. 6, the device 500 includes one or more processing units 561 that are configured to access a memory 562 having instructions stored thereon. The instructions or computer programs may be configured to perform one or more of the operations or functions described with respect to the device 500. For example, the instructions may be configured to control or coordinate the operation of the various components of the device. Such components include, but are not limited to, display 502, one or more input/output components 563, one or more communication channels 564, one or more sensors 565, a speaker 506, microphone 507, and/or one or more haptic feedback devices 566. In some embodiments the speaker and microphone may be combined into a single unit and/or may share a common port through a housing of the device.

The processing units 516 of FIG. 6 may be implemented as any electronic device capable of processing, receiving, or transmitting data or instructions. For example, the processing units 516 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

In some embodiments the electronic device may accept a variety of bands, straps, or other retention mechanisms (collectively, "bands"). These bands may be removably connected to the electronic device by a lug that is accepted in a recess or other aperture within the device and locks thereto. The lug may be part of the band or may be separable (and/or separate) from the band. Generally, the lug may lock into the electronic device's recess and thereby maintain connection between the band and device. The user may release a locking mechanism to permit the lug to slide or otherwise move out of the recess. In some embodiments, the recess may be formed in the band and the lug may be affixed or incorporated into the device.

A user may change combinations of bands and electronic devices, thereby permitting mixing and matching of the two categories. It should be appreciated that devices having other forms and/or functions may include similar recesses and may releasably mate with a lug and/or band incorporating a lug. In this fashion, an ecosystem of bands and devices may be envisioned, each of which is compatible with another. A single band may be used to connect to devices, as one further example; in such embodiments the band may include electrical interconnections that permit the two devices to transmit signals to one another and thereby interact with one another.

In many embodiments, the electronic device may keep and display time, essentially functioning as a wristwatch among other things. Time may be displayed in an analog or digital format, depending on the device, its settings, and (in some cases) a user's preferences. Typically, time is displayed on a digital display stack forming part of the exterior of the device.

The display stack may include a cover element, such as a cover glass, overlying a display. The cover glass need not necessarily be formed from glass, although that is an option; it may be formed from sapphire, zirconia, alumina, chemically strengthened glass, hardened plastic and so on. Likewise, the display may be a liquid crystal display, an organic light-emitting diode display, or any other suitable display technology. Among other elements, the display stack may include a backlight in some embodiments.

The device also may comprise one or more touch sensors to determine a location of a touch on the cover glass. A touch sensor may be incorporated into or on the display stack in order to determine a location of a touch. The touch sensor may be self-capacitive in certain embodiments, mutual-capacitive in others, or a combination thereof.

Similarly, the device may include a force sensor to determine an amount of force applied to the cover glass. The force sensor may be a capacitive sensor in some embodiments and a strain sensor in other embodiments. In either embodiment, the force sensor is generally transparent and made form transparent materials, or is located beneath or away from the display in order not to interfere with the view of the display. The force sensor may, for example, take the form of two capacitive plates separated by silicone or another deformable material. As the capacitive plates move closer together under an external force, the change in capacitance may be measured and a value of the external force correlated from the capacitance change. Further, by comparing relative capacitance changes from multiple points on the force sensor, or from multiple force sensors, a location or locations at which force is exerted may be determined. In one embodiment the force sensor may take the form of a gasket extending beneath the periphery of the display. The gasket may be segmented or unitary, depending on the embodiment.

The electronic device may also provide alerts to a user. An alert may be generated in response to: a change in status of the device (one example of which is power running low); receipt of information by the device (such as receiving a message); communications between the device and another mechanism/device (such as a second type of device informing the device that a message is waiting or communication is in progress); an operational state of an application (such as, as part of a game, or when a calendar appointment is imminent) or the operating system (such as when the device powers on or shuts down); and so on. The number and types of triggers for an alert are various and far-ranging.

The alert may be auditory, visual, haptic, or a combination thereof. A haptic actuator may be housed within the device and may move linearly to generate haptic output (although in alternative embodiments the haptic actuator may be rotary or any other type). A speaker may provide auditory components of an alert and the aforementioned display may provide visual alert components. In some embodiments a dedicated light, display, or other visual output component may be used as part of an alert.

The auditory, haptic and/or visual components of the alert may be synchronized to provide an overall experience to a user. One or more components may be delayed relative to other components to create a desired synchronization between them. The components may be synchronized so that they are perceived substantially simultaneously; as one example, a haptic output may be initiated slightly before an auditory output since the haptic output may take longer to be perceived than the audio. As another example, a haptic output (or portion thereof) may be initiated substantially before the auditory output but at a weak or even subliminal level, thereby priming the wearer to receive the auditory output.

Figure 7:
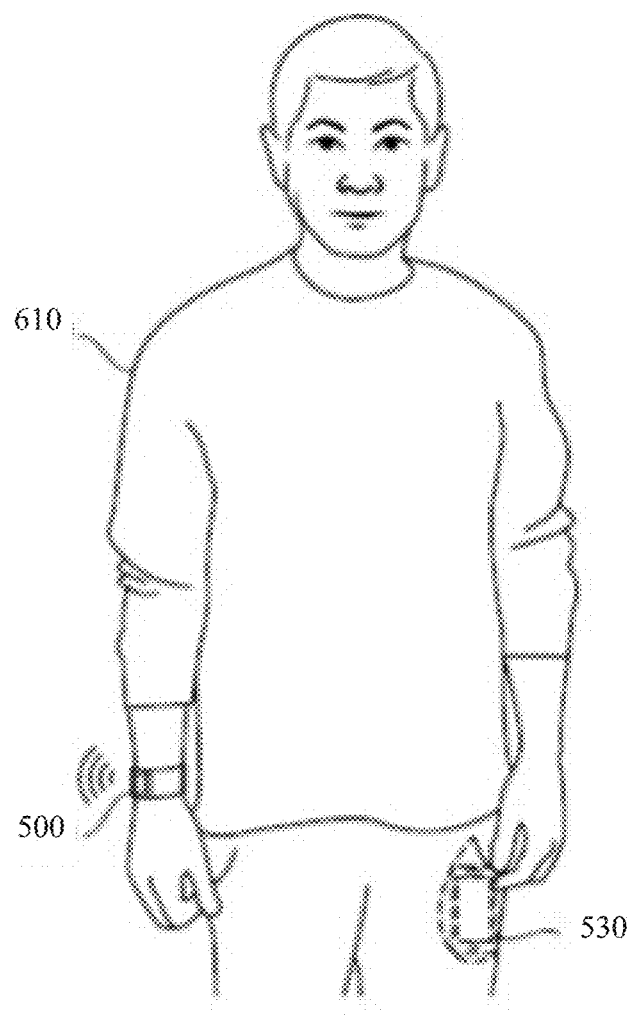
FIG. 7 depicts a user wearing a sample electronic device with a second electronic device in his pocket.

The example electronic device may communicate with other electronic devices either through a wired connection or wirelessly. Data may be passed between devices, permitting one device to relay information to another; control another; employ another's sensors, outputs, and/or inputs; and so on. FIG. 7 depicts a user 610 wearing a sample electronic device 500 with a second electronic device 530 in his pocket. Data may be wirelessly transmitted between the electronic devices 500, 530, thereby permitting the user 610 to receive, view, and interact with data from the second device 530 by means of the first electronic device 500. Thus, the user 610 may have access to part or all of the second device's functionality through the first electronic device 500 without actually needing to interact directly with the second device.

Further, the electronic devices 500, 530 may cooperate not only to share data but to share functionality as well. For example, one of the two devices may incorporate a sensor, application, or function that the other lacks. The electronic device lacking such capabilities may request them from the other device, which may share wirelessly with the requesting device. Thus, multiple devices may operate together to provide expanded functions, software, access and the like between the two and ultimately to a user. As one non-limiting example, the electronic device 500 may be unable to place or receive telephone calls while the second device 530 may be able to do so. A user may nonetheless make and/or receive calls through the first device 500, which may employ the second device 530 to actually place or accept a call.

As another non-limiting example, an electronic device 500 may wirelessly communicate with a sales terminal nearby, thus permitting a user to quickly and efficiently conduct a transaction such as selling, buying, or returning a good. The electronic device may use near field communications technology to perform these and other functions.

As mentioned above, a band may be connected to two electronic devices and may serve as a wired communication path between the two. As another example, the devices may communicate wirelessly, thereby permitting one device to relay information from a second to a user. This latter example may be particularly useful when the second is inaccessible.

Certain embodiments may incorporate one or more biometric sensors to measure certain physiological characteristics of a user. The device may include a photoplesymogram sensor to determine a user's heart rate or blood oxygenation levels, for example. The device may also or instead include electrodes to measure the body impedance of a user, which may permit the device to estimate body fat percentages, the body's electrical activity, body impedance, and so on. Also include blood pressure, ultraviolet exposure, etc. Depending on the sensors incorporated into or associated with the electronic device, a variety of user characteristics may be measured and/or estimated, thereby permitting different health information to be provided to a user.

Certain embodiments may be wirelessly charged. For example, an inductive charging base may transmit power to an inductive receiver within the device in order to charge a battery of the device. Further, by varying the inductive field between the device and base, data may be communicated between the two. As one simple non-limiting example, this may be used to wake the base from a low-power sleep state to an active charging state when the device is placed on the base. Other wireless charging systems also may be used (e.g., near field magnetic resonance and radio frequency). Alternatively, the device also may employ wired charging through electrodes.

In certain embodiments, the device may include a rotary input, which may take the form of a crown with a stem. The crown and stem may be rotated to provide the rotary input. Rotation of the stem and/or crown may be sensed optically, electrically, magnetically, or mechanically. Further, in some embodiments the crown and stem may also move laterally, thereby providing a second type of input to the device.

The electronic device may likewise include one or more buttons. The button(s) may be depressed to provide yet another input to the device. In various embodiments, the button may be a dome switch, rocker switch, electrical contact, magnetic switch, and so on. In some embodiments the button may be waterproof or otherwise sealed against the environment.

Various embodiments may include or otherwise incorporate one or more motion sensors. A motion sensor may detect motion of the device and provide, modify, cease, or otherwise affect a state, output, or input of the device or associated applications based on the motion. As non-limiting examples, a motion may be used to silence the device or acknowledge an alert generated by the device. Sample motion sensors include accelerometers, gyroscopic sensors, magnetometers, GPS sensors, distance sensors, and so on. Some embodiments may use a GPS sensor to facilitate or enable location and/or navigation assistance.

As shown in FIG. 6, the device 500 may also include one or more acoustic elements, including a speaker 506 and/or a microphone 507. The speaker 506 may include drive electronics or circuitry and may be configured to produce an audible sound or acoustic signal in response to a command or input. Similarly, the microphone 507 may also include drive electronics or circuitry and is configured to receive an audible sound or acoustic signal in response to a command or input. The speaker 506 and the microphone 507 may be acoustically coupled to port or opening in the case that allows acoustic energy to pass, but may prevent the ingress of liquid and other debris.

Certain embodiments may incorporate an ambient light sensor. The ambient light sensor may permit the device to sense a brightness of its environment and adjust certain operational parameters accordingly. For example, the electronic device may modify a brightness of a display in response to the sensed ambient light. As another example, the electronic device may turn the display off if little or no light is sensed for a period of time.

These and other functions, operations, and abilities of the electronic device will be apparent upon reading the specification in its entirety.

Figure 8:
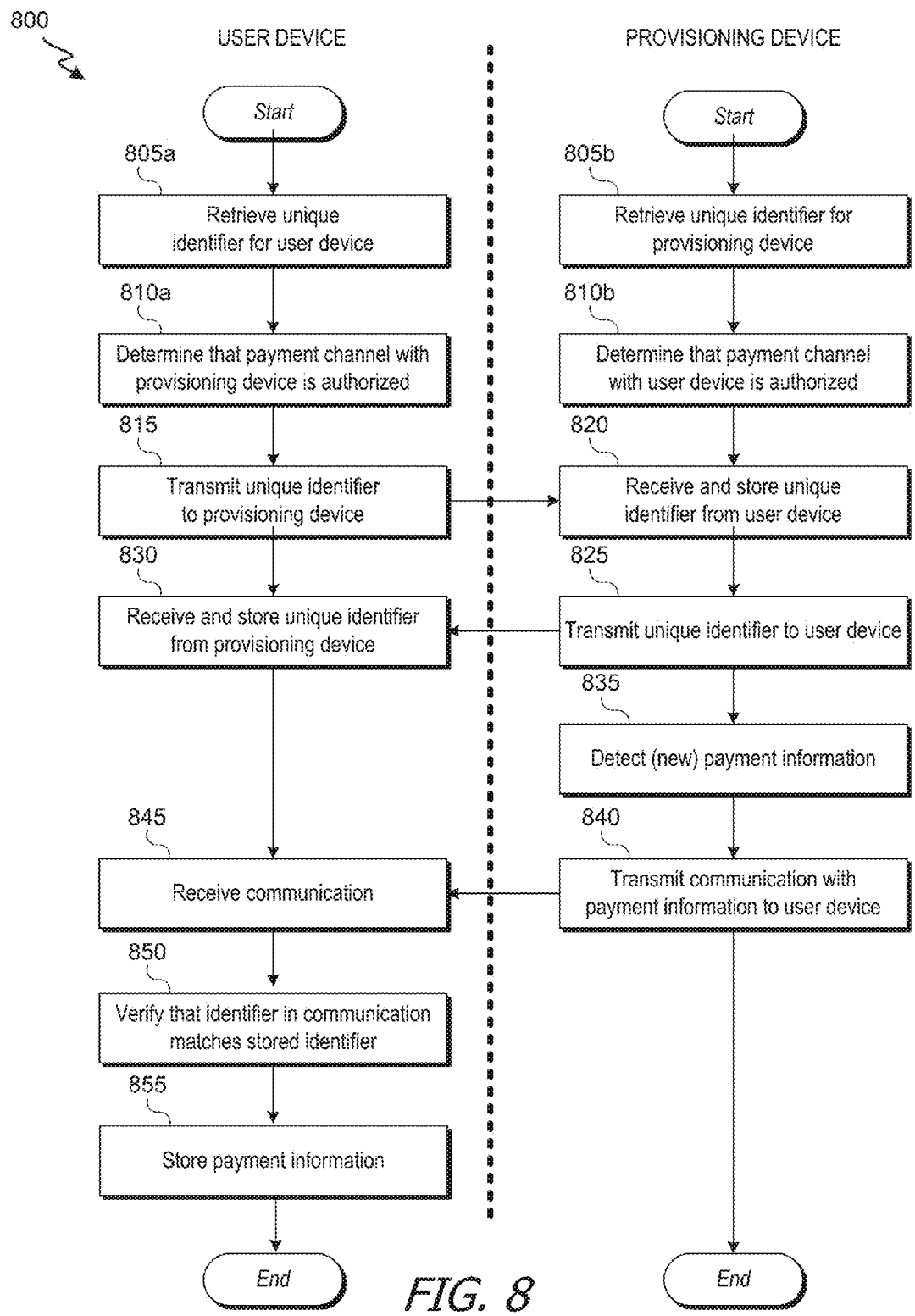
FIG. 8 is a flow diagram of a process for provisioning a user device with payment information in accordance with an embodiment of the invention.

FIG. 8 is a flow diagram of a process 800 for provisioning a user device with payment information in accordance with an embodiment of the invention. In this embodiment, a user device (e.g., a wearable user device) can communicate with a provisioning device (which can be another user device) to receive payment information. In some instances, each of the user device and the provisioning device are a device of a single user and/or are a mobile electronic device. In some instances, the user device and the provisioning device are paired together and/or are associated with a same account (e.g., an operating system account, an account for an app or a payment account).

Process 800 begins at blocks 805*a* and 805*b* where each of the user device and the provisioning device retrieve a unique identifier for the respective device. The unique identifier can include one assigned at a manufacturing time and/or permanently stored in the device. In some instances, the unique identifier is assigned by an operating system or app At blocks 810*a* and 810*b*, each of the user device and provisioning device determine that a payment channel with the other device is authorized. This determination can be made based on, for example, a determination that the devices are paired, a determination that a code entered at one device is one presented on the other device, and/or a determination that a signal received from the other device includes data matching locally stored data. In some instances, the determination is based at least in part on a context, a separation distance between the two devices, and/or a device state (e.g., being worn, active, and/or asleep) of one or both devices.

At blocks 815 and 820, the user device transmits its unique identifier (an "electronic device unique identifier") to the provisioning device, which then stores the identifier. At blocks 825 and 830, the provisioning device transmits its unique identifier (a "provisioning device unique identifier") to the user device, which then stores the identifier.

The provisioning device detects payment information at block 835. For example, the provisioning device can detect a new payment account, a removal of a payment account and/or a modification of a payment account. The detection can include detecting new or changed payment information for a payment account. The detection can occur, for example, in response to receiving user input at the provisioning device and/or receiving a communication from a payment server (e.g., directly or via a trusted service manager).

At blocks 840 and 845, the provisioning device transmits a communication that includes at least some of the payment information to the user device, which receives the communication. The provisioning device can use the stored electronic device unique identifier of the user device to determine that the user device is to be a destination for the information. The communication can include (in its content or metadata) the device identifier that identifies which device is sending the communication (e.g., such that, in this instance, it is the same as the provisioning device unique identifier).

At block 850, the user device can verify that the device identifier included in the communication matches the stored provisioning device unique identifier. Upon such verification, the user device can store the payment information in the communication at block 855. Block 855 can include securely storing the payment information. For example, the received payment information may be encrypted or the user device may encrypt the information, and the payment information can be stored in an encrypted format. In some instances, the payment information in the communication includes updated payment information, and block 855 can include updating stored payment information.

It will be appreciated that, while process 800 includes transmitting of payment information from the provisioning device to the user device, other data can also or alternatively be transmitted. Such other data can include, e.g., a selection protocol, restriction or reward information and/or usage data. In some instances, the user device transmits data to the provisioning device (e.g., identifying a selection of a payment account or usage data).

By using a provisioning device, a payment server or use device need not transmit data (e.g., related to account management or updates or usage or input data) to each device associated with a user. Rather, data can be transmitted to a single provisioning device, which can then distribute pertinent information to each of any other associated user device.

In some instances, a provisioning device is required to initialize another user device with payment information associated with a user. In some instances, the provisioning device is further required to provide updates pertaining to one or more payment accounts. Nonetheless, a user device can be able to participate in transaction processes independently from the provisioning device. Thus, in at least some instances, the user device need not be in communication with a provisioning device to transmit payment information to a POS terminal. This can occur, for example, because the user device can locally store payment information needed to participate in the transaction.

Various portions of process 800 refer to transmission and storage of data. It will be appreciated that the transmission and/or storage associated with at least some of these blocks can be secure. For example, data can be encrypted.

Figure 9:
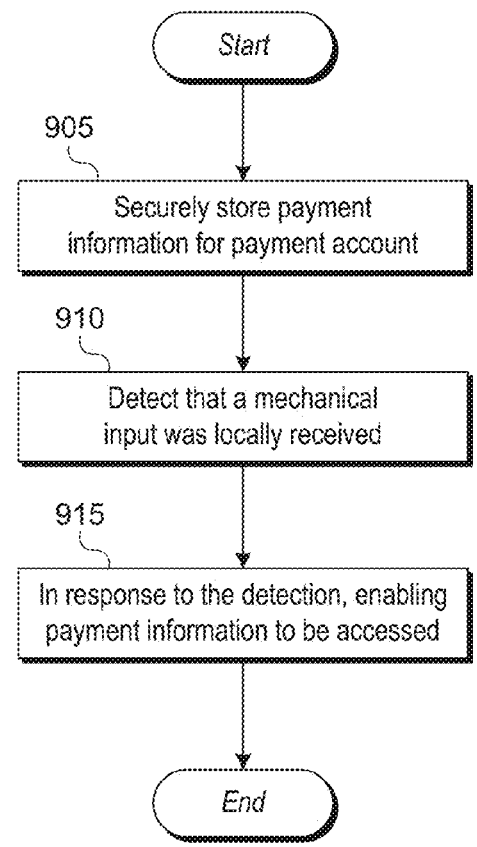
FIG. 9 is a flow diagram of a process for a user device participation in a transaction in accordance with an embodiment of the invention.

FIG. 9 is a flow diagram of a process for a user device participation in a transaction in accordance with an embodiment of the invention. Process 900 can be performed, in part or in its entirety, by a user device, such as a wearable electronic device.

Process 900 begins at block 905 where payment information for a payment account is securely stored at an electronic device (e.g., at a secure element of the electronic device). The payment account can correspond to, for example, a credit card account, checking or debit account, gift account, value account or online payment account. The payment information can include, for example, a number (e.g., an account number) associated with a credit card, checking account, debit card, gift account or value account. The payment information can be received, e.g., via a provisioning process from another device, based on user input and/or based on automatic detection (e.g., from an image of a credit card). The information can be securely stored by, e.g., encrypting the data.

At block 910, a detection of local receipt of a mechanical input can occur. The mechanical input can include, for example, a button click and/or a non-virtual input, such as an input distinct from merely touching or clicking on a particular portion of a screen or display of a device.

In some instances, receipt of non-mechanical input can also be detected. Such non-mechanical input can include, for example, touchscreen input, a voice command and/or a gesture. The non-mechanical input can be received concurrently with, before or after receipt of the mechanical input. The non-mechanical input can include biometric input.

In one instance, part of the payment-authorizing input can be received as part of the identification of the payment account. For example, a first input can cause an account to be initially identified. A user can then have an opportunity to modify the account selection (e.g., by interacting with a display). A second input can represent a satisfaction with the initial selection (if no modifying input was received between the two inputs) or the modified selection. Thus, the payment-authorizing input can, in some instances, include multiple inputs. The first and second inputs may be of a same type (e.g., press of a same button). It will also be appreciated that, in some instances, a user can select an account prior to providing any payment-authorizing input. In one instance, a user can browse through available accounts. Entering a payment-authorizing input while viewing a representation of a particular account can correspond to a selection of the account.

At block 915, in response to the detection that mechanical input was locally received, access to the stored payment information can be enabled. Such enablement can include, for example, retrieving the information from a local data store (e.g., by a secure element) and/or decrypting the information (e.g., using a key).

In some embodiments, a single condition can govern whether access will be enabled to payment information and/or payment information is transmitted. In some embodiments, access to payment information can only be enabled and/or payment information is only transmitted when a single type of input (e.g., mechanical, non-virtual and/or pressing of a button) is detected. In some embodiments, if any of multiple types of interactions are detected, access can be granted to payment information and/or payment information can be transmitted. For example, a press (or two presses) of a button can be sufficient, or a user's virtual interaction with a transaction app (e.g., to virtually select an account or request payment transmission) can be sufficient. As another example, access enablement may require a button press and entry of a pin number or passcode, a mechanical input and a voice command, or a mechanical input and a wrist rotation and/or height adjustment movement detection.

In some instances, payment information can be stored for each of a plurality of accounts. Block 915 can include enabling access to any or all of the accounts' payment information or enabling access to payment information for a select one or incomplete subset of the accounts. The select account(s) can be identified using a selection protocol, a designation of a default account and/or user input (e.g., that identifies a default account, identifies an account to use for a particular point of sale, or rejects an initially selected account for another account).

The retrieved payment information can be transmitted to a POS terminal. The payment information can be transmitted over a short range and/or using NFC. In some instances, a pass that includes the payment information can be generated or retrieved, and the pass can be transmitted. In some instances, receipt of the input, identification of the account and/or retrieval of the payment information starts a clock for sending the payment information. If the user device cannot communicate with the POS terminal (e.g., over an authorized type of channel) before a time period of the clock expires, the transmission of payment information can be prevented unless further payment-authorizing input is detected.

It will be appreciated that, in some instances, process 900 can be modified such that instead of or in addition to transmitting payment information to a POS terminal at block 920, payment information can be released such that it is made accessible to an app on the user device (e.g., which may cause the information to be transmitted to an app-related server).

Figure 10:
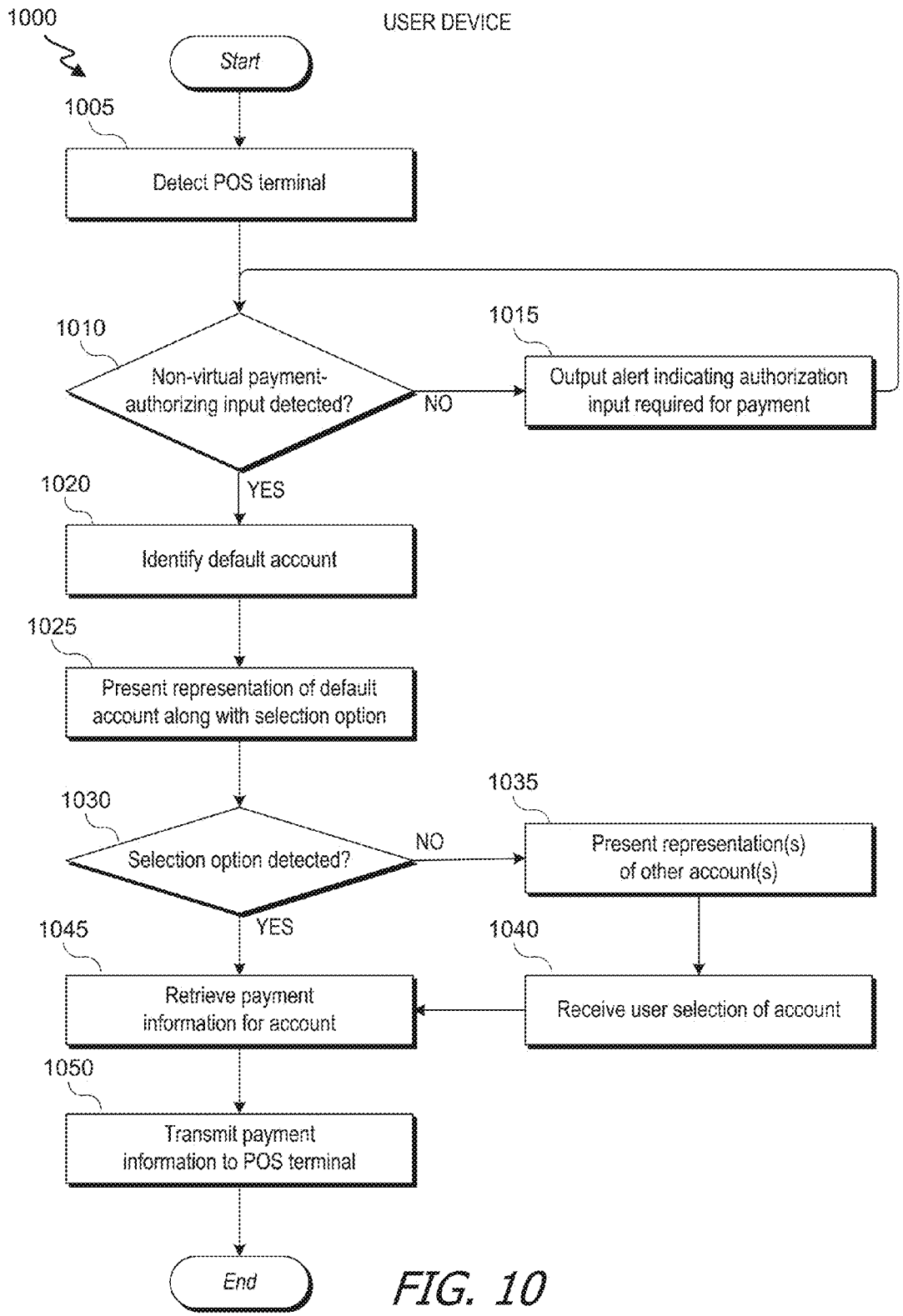
FIG. 10 is a flow diagram of a process for a user device participation in a transaction in accordance with an embodiment of the invention.

FIG. 10 is a flow diagram of a process 1000 for a user device participation in a transaction in accordance with an embodiment of the invention. Process 1000 can be performed, in part or in its entirety, by a user device Process 1000 begins at block 1005 where the user device can detect a POS terminal. For example, an NFC antenna of the user device can detect a magnetic field transmitted via an NFC antenna of the POS terminal. As another example, a tag detection or dispatch system on the user device can discover an NFC tag associated with the POS terminal. The detection can include receiving data from the POS terminal (e.g., via NFC). The data can indicate that the user device is near a device that is a POS terminal. In some instances, the user device can analyze the data and determine that the data is to be handled by a transaction app on the device.

At block 1010, the user device can determine whether a payment authorizing input has been detected (e.g., subsequent to the detection of the POS terminal). For example, it can be determined whether an input of a type described with respect to block 905 of process 900 or elsewhere herein was detected at the device. In some instances, it can be required that the payment-authorizing input be detected while the POS terminal is detected or within a defined time period from detection of the POS terminal. In some instances, it can be required that the POS terminal be detected within a defined time period from the detection of the payment-authorizing input.

When no such input is detected, process 1000 can continue to block 1015 where the device can output an alert that indicates that payment-authorizing input has not been detected. The alert can include, for example, a haptic stimulus (e.g., a vibration) or an audio stimulus (e.g., a tone). In some instances, the alert includes a visual stimulus (e.g., with text identifying a type of input designated as payment-authorizing input). Process 1000 can then return to block 1010 to continue to monitor for payment-authorizing input.

When a POS terminal and a payment-authorizing input have been detected, process 1000 can continue to block 1020 where a default payment account can be identified. In one instance, the default payment account can include one associated with a highest number of uses (e.g., on the device, on a set of devices associated with a user or user account, or generally) generally or during a time period. For example, the user device can receive information from a payment server (directly or indirectly, such as through a provisioning device) that identifies data for a set of purchases made using an account (e.g., which may or may not be through a user device). In one instance, the default payment account can include one selected by a user to be the default account. In one instance, the default payment account can include one selected by a user (e.g., a threshold number or percentage of times) to use instead of an initially selected account.

In some instances, the default account depends on, e.g., a balance on one or more accounts (e.g., such that an account with a lowest balance is used or such that an account is not used if the balance exceeds a threshold), a rewards protocol for one or more accounts (e.g., to select an account or be biased towards an account with a high rewards offering for a given purchase), a restriction for one or more accounts (e.g., to be biased against selecting an account with a low limit), and/or an interest rate for one or more accounts (e.g., to select or be biased towards an account with a below-threshold, low or lowest interest rate).

In some instances, an identity of a default payment account can depend on a context, such as a geographic location, POS terminal identifier (e.g., identifying a merchant), a time of day. For example, a determination can be made to determine whether any account corresponds to merchant information associated with a POS terminal, and—if so—the account can be used as a default account for the terminal.

A learning technique can be used to determine which account to use as a default account (e.g., in general or for a particular context). The learning technique can be based on, for example, accounts used for payment at the device, accounts used for payment at other devices, accounts used for payment in general and/or user responses to one or more past notifications of a default account.

At block 1025, a representation of the default account can be presented. For example, a name of the account and/or graphic associated with the account (e.g., a graphical representation or picture of a card for the account) can be presented. In one instance, a "pass" representation of an account can be presented that includes account details. A modification option can be presented with the representation that, when selected, can allow a user to identify a different account. Selection of the option can cause an identification of each of one or more other payment accounts to be presented.

The modification option can be explicit and visible or invisible. For example, a representation of a card can be presented without any explicit, visible option indicating that the card can be changed. Nonetheless, a particular user action, such as horizontally moving a finger or cursor across a screen can cause a representation of another account to be shown. A visible or invisible confirmation option can be presented to allow a user to indicate that a particular account (e.g., one associated with a currently presented representation) is to be used.

When it is detected that the user provided input selecting the selection option, process 1000 can continue to block 1035 where a representation of each of one or more other accounts can be presented. The representation can be of a same type of the representation presented at block 1025 or can be of a different type. In instances where multiple payment accounts are available, representations of the other accounts can be presented concurrently (e.g., in a list or table format) or sequentially. When representations are presented sequentially, each representation can be presented along with a selection option, such that a user can iteratively view available account representations. Each of one or more representations can be presented with a modification option (e.g., to cause a representation of a different account to be shown) and/or a confirmation option (e.g., to select an account associated with a currently presented representation to be used).

At block 1040, a user selection of a particular payment account is detected. For example, a detection of a selection of a confirmation option can be detected, and it can be determined which account was selected or represented at a time of the selection.

At block 1045, payment information can be retrieved for the account. At block 1050, at least part of the payment information can be transmitted to the POS terminal. Blocks 1045 and 1050 can correspond to blocks 915 and 920 of process 900.

It will be appreciated that, in some instances, process 1000 can be modified such that instead of or in addition to detecting a POS terminal at block 1005, a detection of an app execution or app call can be made. Further, instead of or in addition to transmitting payment information to a POS terminal at block 1050, payment information can be released such that it is made accessible to the app on the user device (e.g., which may cause the information to be transmitted to an app-related server).

Figure 11:
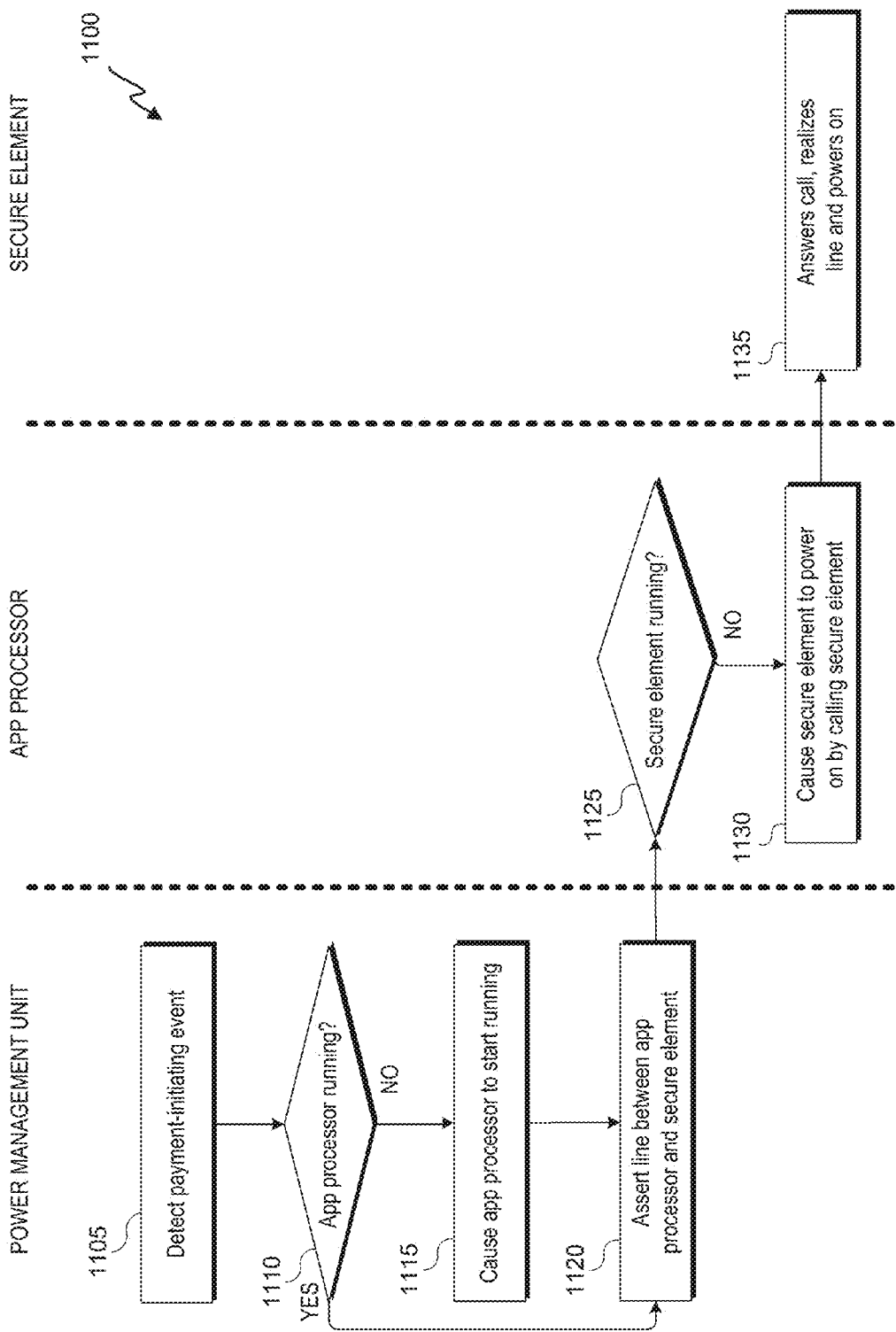
FIG. 11 is a flow diagram of a process for responding to a payment-initializing event while involved component is not running in accordance with an embodiment of the invention.

FIG. 11 is a flow diagram of a process 1100 for responding to a payment-initializing event while involved component is not running in accordance with an embodiment of the invention. Various portions of process 1100 can be performed by a power management unit, app processor and/or secure element. In some instances, each of the power management unit, app processor and secure element are part of a single user device.

Process 1100 begins at block 1105 where a power management unit detects that a payment-initiating event has occurred. The detection can include, for example, detecting part or all of a payment-authorizing input or detecting a POS terminal.

At block 1110, the power management unit can determine whether an app processor for a transaction app is running. This determination can be based on whether the power management unit is supplying power to the app processor.

When it is determined that the app processor is not running, process 1100 can continue to block 1115 where the power management unit can cause the app processor to start running. For example, the power management unit can begin supplying power to the app processor.

At block 1120, the power management unit can assert a communication path between the app processor and a secure element. The communication path can include one configured to enable the app processor to send one or more messages to the secure element.

At block 1125, in some (though not all) embodiments, the app processor can determine whether the secure element is running. When it is determined that it is not running, at block 1130, the app processor can cause power to be supplied to the secure element by calling the secure element using the line. The secure element can answer the call at block 1135, thereby realizing the line and powering on.

Thus, even if the secure element and/or app processor on a device is not currently running, a payment-initializing event can cause the device to cause the appropriate elements to receive power and begin execution.

Figure 12:
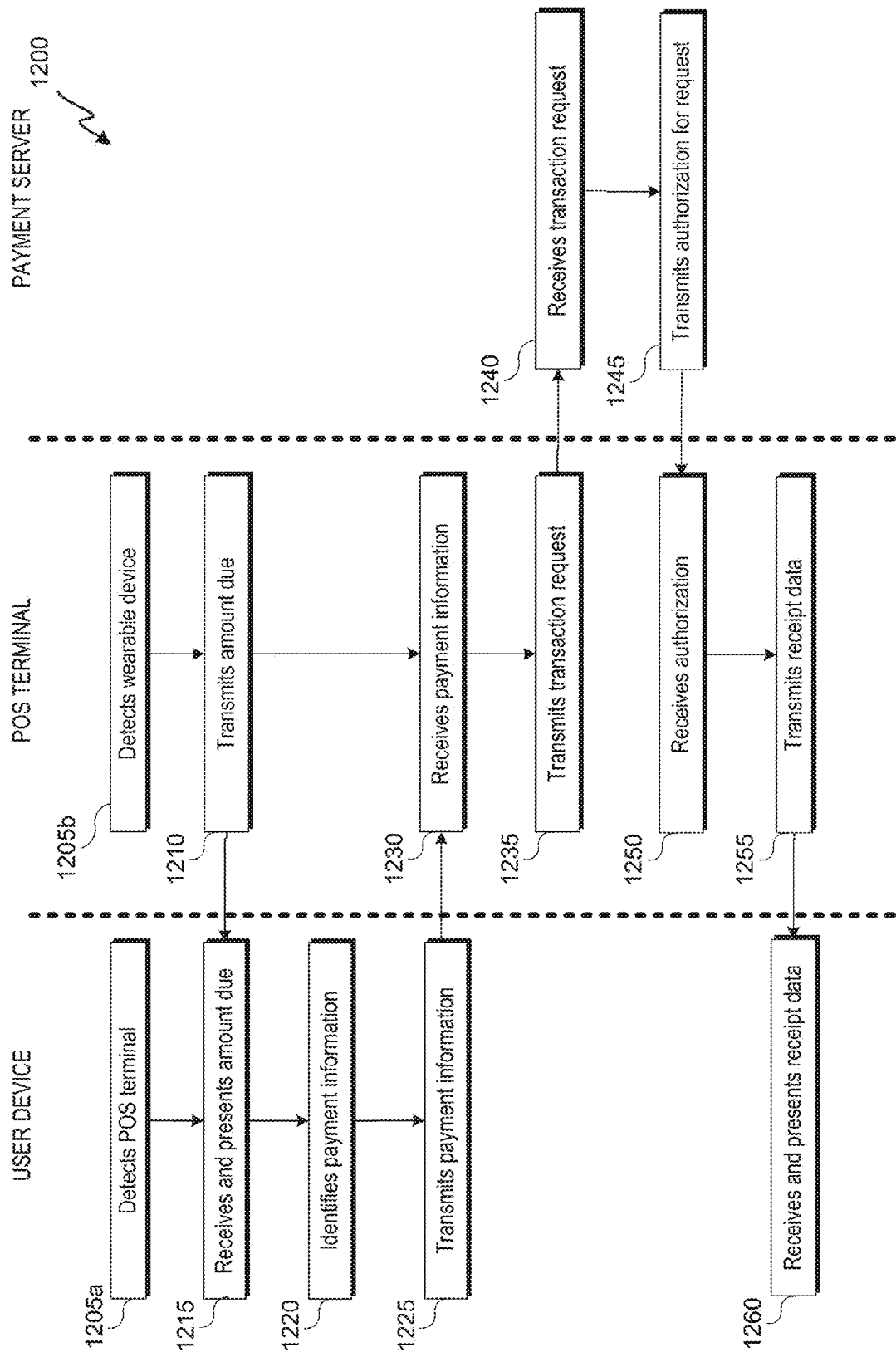
FIG. 12 is a flow diagram of a process for communicating between devices to complete a transaction in accordance with an embodiment of the invention.

FIG. 12 is a flow diagram of a process 1200 for communicating between devices to complete a transaction in accordance with an embodiment of the invention. Process 1200 begins at blocks 1205a where a user device detects a POS terminal and at block 1205b where the POS terminal detects the wearable device. For example, an NFC antenna of the detecting can detect a magnetic field transmitted via an NFC antenna of the other device. As another example, a tag detection or dispatch system on the detecting device can discover an NFC tag associated with the other device. The detection can include receiving data from the POS terminal (e.g., via NFC). The data can indicate that the detecting device is near a device that is a type of the other device (e.g., a user device or POS terminal). In some instances, the detecting device can analyze the data and determine that the data is to be handled by a transaction app on the device.

At block 1210, the POS terminal can transmit an amount due, and at block 1215, the user device can receive and present the amount due. The amount due can reflect an amount of a purchase. The amount due can be determined at a POS terminal (e.g., by scanning a code associated with each of one or more inputs or based on input received at the terminal) or it can be determined at another device, which can transmit the amount to the POS terminal.

At block 1220, the user device can identify payment information. For example, the user device can identify a payment account (e.g., as described herein) and can then identify payment information for that account (e.g., as described herein). At block 1225, the user device transmits the payment information to the POS terminal, and at block 1230, the POS terminal receives the payment information.

At block 1235, the POS terminal transmits a transaction request to a payment server, and at block 1240, the payment server receives the request. In some instances, POS terminal can identify the payment server based on at least some of the payment information. In some instances, this communication is indirect. For example, the POS terminal can communicate with a transaction-coordination server, which can communicate with the payment server. The payment server can include a server of an issuing bank associated with an identified payment account. In some instances, the POS terminal indirectly transmits the transaction to the payment server (e.g., via a server of an acquiring bank and/or a server of a card network).

The transaction request can include an account identifier, and the payment server can verify the existence and/or status (e.g., absolute balance or balance relative to a limit) of the account. The transaction request can further include the amount due. The payment server can then determine whether the payment of the amount due would result in exceeding any account constraints (e.g., causing a balance to exceed a limit or causing a criterion of suspicious behavior to be met, such as due to a count or amount of recent charges). If no constraints would be exceeded, the payment server can determine that the purchase is authorized.

At block 1245, the payment server can transmit an authorization to the POS terminal, which can receive the authorization at block 1250. The authorization can be sent from directly or indirectly (e.g. via a server of an acquiring bank and/or a server of a card network) to the POS terminal.

Upon receiving the authorization, the POS terminal can cause receipt data to be transmitted receipt data to the user device at block 1255. In one instance, initiation of a purchase can cause a payment network server to transmit receipt data to a transaction-coordination server, which can transmit the receipt data (or a processed version thereof) to the user device. The receipt data can include the amount due, a date, a time, a merchant identifier, an identifier of the payment account, and/or an identifier of one or more products or services purchased.

The user device can receive the receipt data and present at least part of the receipt data at block 1260. In some instances, the user device processes the receipt data to generate the presentation. At least some of the receipt data can be stored in association with the transaction app or another app and/or transmitted to another device (e.g., another user device or an app server). Such storage and/or transmission can provide the ability to generate analytics related to purchasing patterns and/or account selections and authorizations.

It will be appreciated that figures shown herein are illustrative, and various modifications are contemplated. For example, with regard to process 1200, in some instances, POS terminal does not transmit an amount due before and/or after a transaction occurs. Further, a user device need not detect a POS terminal and/or a POS terminal need not detect a user device until after an account is selected and/or confirmed and/or until a payment-authorizing input is received at the user device.

Embodiments disclosed herein provide a variety of useful inter-device transaction coordination capabilities and advantages. Storage of payment information on a user device allows for a user to conveniently use an electronic device to complete purchases rather than needing to carry both a user device (used for other purposes, such as making phone calls and checking email) and a wallet. Further, embodiments provide for the storage of payment information for multiple accounts and include convenient techniques for selecting an account to use for a particular transaction. The selection can be based on, for example, general user input (e.g., identifying a default account), user input specific for a current transaction and/or learning technique. This can prevent the need for a user to carry and sort through multiple cards and can further aid a user in tailoring account selections for particular contexts (e.g., to improve reward collections).

A risk of allowing a user device to participate in transactions is that there can be a potential that payment information will be accessed by unintended recipients. For example, there can generally be a risk that a nearby device can eavesdrop on a communication with payment information, or that malicious software on a device can retrieve the payment information and transmit it to another device without authorization by a user. Embodiments of the invention provide several techniques that can mitigate this potential. First, payment information can be securely stored and controlled by a secure element. The secure element can condition access on detection of a local input. For example, access can be prevented unless it is detected that a button on the device has been mechanically pressed. Such conditioning can inhibit software from accessing the payment information without a corresponding user intent to do so. Second, payment information can be transmitted using NFC. The very short range of this communication can reduce an opportunity for a nearby device to receive the information The foregoing description may make reference to specific examples of a user device, such as a wearable device. It is to be understood that these examples are illustrative and not limiting; other devices can be substituted and can implement similar functional blocks and/or algorithms to perform operations described herein and/or other operations. In some instances, a user device can be non-wearable and/or non-mobile.

Embodiments of the present invention, e.g., in methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A computer-implemented method comprising:
   securely storing, at an electronic device, payment information associated with a payment account;
   detecting a proximate point-of-sale (POS) terminal;
   in response to detecting the proximate POS terminal, determining that a mechanical input authorizing a payment transaction has not been locally received at the electronic device within a time period;
   in response to the determination, presenting a stimulus indicating that the mechanical input has not been locally received;
   detecting subsequent to the stimulus presentation, at the electronic device, a mechanical input;
   in response to detecting the mechanical input, enabling, at the electronic device, the payment information to be retrieved from the secure element and accessed; and
   transmitting, from the electronic device, a communication including the payment information to the POS terminal.

2. The method of claim 1, wherein the communication is transmitted using near-field communication (NFC).

3. The method of claim 1, wherein detecting that the mechanical input has been locally received at the electronic device includes detecting that a button on the electronic device has been pressed.

4. The method of claim 1, wherein detecting that the mechanical input has been locally received at the electronic device includes detecting that a non-virtual button of the electronic device has been clicked.

5. The method of claim 1, wherein the enabling of the payment information to be accessed is further in response to detecting that a biometric or virtual input has been locally received at the electronic device.

6. The method of claim 1, wherein the securely storing the payment information includes storing an encrypted version of the payment information, and wherein enabling the payment information to be accessed includes decrypting the encrypted version of the payment information.

7. The method of claim 1, further comprising:
   in response to detecting that the mechanical input has been locally received at the device, presenting a representation of a default payment account.

8. The method of claim 1, further comprising:
   receiving a user input corresponding to a selection of the payment account to use for a transaction instead of a default payment account.

9. The method of claim 1, further comprising, in response to detecting that the mechanical input has been locally received at the device, selecting the payment account from amongst a plurality of payment accounts based on application of a learning technique.

10. The method of claim 1, further comprising:
    receiving a signal from another electronic device, wherein each of the electronic device and the another electronic device is a mobile user device; and updating the securely stored payment information based on the signal.

11. The method of claim 1, further comprising:
transmitting a unique electronic device identifier to a provisioning device;
receiving a unique provisioning device identifier from the provisioning device;
storing the unique provisioning device identifier;
receiving a communication including the payment information from the provisioning device; and
determining that a device identifier in the communication matches the stored unique provisioning device identifier;
wherein the payment information is securely stored in response to determining that the device identifier matches the stored unique provisioning device identifier.

12. The method of claim 1, wherein the electronic device is a wearable electronic device.

13. The method of claim 1, wherein the payment information includes a number associated with a credit card, debit card, gift account, or value account.

14. An electronic device comprising:
a user interface component configured to output stimuli and receive inputs;
a connection component configured to transmit communications to other devices,
one or more processors coupled to the user interface component-and the connection component; and
a computer-readable storage medium containing instructions, that, when executed by the one or more processors, cause the one or more processors to perform actions including:
securely storing, at the electronic device, payment information associated with a payment account;
detecting a proximate POS terminal;
in response to detecting the proximate POS terminal, determining that a mechanical input authorizing a payment transaction has not been locally received at the electronic device within a time period;
in response to the determination, presenting a stimulus indicating that the mechanical input has not been locally received;
detecting, subsequent to the stimulus presentation, via the user interface component, a mechanical input was locally received at the electronic device;
in response to detecting that the mechanical input has been locally received at the device, enabling the payment information to be accessed; and
transmitting, from the electronic device, a communication including the payment information to the POS terminal.

15. The electronic device of claim 14, further comprising:
an inductor, wherein the communication is transmitted via near-field communication (NFC) using the inductor.

16. The electronic device of claim 14, wherein the user interface includes a button, and wherein the mechanical input is a mechanical push of the button.

17. The electronic device of claim 14, wherein the user interface includes a touchscreen, and wherein enabling of the payment information to be accessed is further in response to detecting that a biometric or virtual input has been received via the touchscreen.

18. The electronic device of claim 14, wherein a secure element in the electronic device securely stores the payment information and enables the payment information to be retrieved from the secure element and accessed in response to the detection that the mechanical input has been locally received.

19. The electronic device of claim 14, wherein the securely storing the payment information includes storing an encrypted version of the payment information, and wherein enabling the payment information to be accessed includes decrypting the encrypted version of the payment information.

20. The electronic device of claim 14, wherein the actions further include:
in response to detecting that the mechanical input has been locally received at the device, presenting a representation of a default payment account.

21. The electronic device of claim 14, wherein the actions further include:
receiving a user input corresponding to a selection of the payment account to use for a transaction instead of a default payment account.

22. The electronic device of claim 14, wherein the actions further include, in response to detecting that the mechanical input has been locally received at the device, selecting the payment account from amongst a plurality of payment accounts based on application of a learning technique.

23. The electronic device of claim 14,
wherein the actions further include:
receiving, via the connection component, a signal from another electronic device, wherein each of the electronic device and the another electronic device is a mobile user device; and
updating the securely stored payment information based on the signal.

24. The electronic device of claim 14, wherein the actions further include:
transmitting a unique electronic device identifier to a provisioning device;
receiving a unique provisioning device identifier from the provisioning device;
storing the unique provisioning device identifier;
receiving a communication including the payment information from the provisioning device; and
determining that a device identifier in the communication matches the stored unique provisioning device identifier;
wherein the payment information is securely stored in response to determining that the device identifier matches the stored unique provisioning device identifier, securely storing the payment information.

25. The electronic device of claim 14, wherein the electronic device is a wearable electronic device.

26. The electronic device of claim 14, wherein the payment information includes a number associated with a credit card, debit card, gift account, or value account.

27. The electronic device of claim 14, wherein detecting that the mechanical input has been locally received at the electronic device includes detecting that a non-virtual button the electronic device has been clicked.

28. A computer-program product tangibly embodied in a non-transitory machine-readable storage medium, including instructions configured to cause one or more data processors to perform actions including:
securely storing payment information associated with a payment account;
detecting a POS terminal;
in response to detecting the POS terminal, determining that a mechanical input authorizing a payment transaction has not been locally received at the electronic device;

in response to the determination, presenting a stimulus indicating that the mechanical input has not been locally received;
detecting that a mechanical input was locally received;
in response to detecting the mechanical input, enabling the payment information to be accessed; and
causing a communication to be transmitted to the POS terminal, wherein the communication includes the payment information.

29. The computer-program product of claim 28, wherein the communication is transmitted using near-field communication (NFC).

30. The computer-program product of claim 28, wherein detecting that the mechanical input has been locally received device includes detecting that a button has been pressed.

31. The computer-program product of claim 28, wherein detecting that the mechanical input has been locally received at the electronic device includes detecting that a non-virtual button has been clicked.

32. The computer-program product of claim 28, wherein the enabling of the payment information to be accessed is further in response to detecting that a biometric or virtual input has been locally received.

33. The computer-program product of claim 28, wherein the actions further include:
in response to detecting that the mechanical input has been locally received, causing a representation of a default payment account to be presented.

34. The computer-program product of claim 28, wherein the actions further include:
detecting a user input corresponding to a selection of the payment account to use for a transaction instead of a default payment account.

35. The computer-program product of claim 28, wherein securely storing the payment information includes storing the payment information at a secure element, and wherein enabling the payment information to be accessed includes retrieving the payment information from the secure element.

36. The computer-program product of claim 28, wherein detecting the POS terminal includes detecting a proximate POS terminal, and wherein detecting whether mechanical user input has been received within the time period from detecting a POS terminal includes detecting whether mechanical user input has been received within the time period from detecting a proximate POS terminal.

37. The computer-program product of claim 28, wherein the actions further include, in response to detecting that the mechanical input has been locally received at the device, selecting the payment account from amongst a plurality of payment accounts based on application of a learning technique.

38. The computer-program product of claim 28, wherein the actions further include:
receiving a signal from a mobile user device; and
updating the securely stored payment information based on the signal.

39. A system comprising:
an input module for receiving a mechanical input;
a detection module in communication with the input module for detecting whether mechanical input has been received within a time period from detecting a POS terminal;
an output module in communication with the detection module for presenting, when the detection module detects that mechanical input has not been received within the time period from detection of a POS terminal, a stimulus indicating that the mechanical input has not been received;
a security module in communication with the detection module for enabling, when the detection module detects that mechanical input has been received within the time period from detection of a POS terminal, access of payment information associated with a payment account stored at a secure element; and
a transmitter module in communication with the security module for transmitting, when the detection module detects that mechanical input has been received within the time period, a communication to the detected POS terminal, wherein the communication includes the payment information.

40. The system of claim 39, wherein the transmitter module transmits the communication to the detected POS terminal using NFC.

41. The system of claim 39, wherein the input module includes a button, and wherein the mechanical input is a mechanical push of the button.

42. The system of claim 39, wherein the input module includes a touchscreen, and wherein the enabling access of the payment information is further in response to detecting that a biometric or virtual input has been received via the touchscreen.

43. The system of claim 39, wherein the enabling access of the payment information includes decrypting an encrypted version of the payment information.

44. The system of claim 39, wherein the
output module is further for presenting a representation of a default payment account in response to the detection of the mechanical input.

45. The system of claim 39, wherein the input module is further for receiving a user input corresponding to a selection of the payment account to use for a transaction instead of a default payment account.

46. The system of claim 39, further comprising:
a receiver module for a signal from another electronic device, wherein each of the electronic device and the another electronic device is a mobile user device,
wherein the security module is further for updating the securely stored payment information based on the signal.

47. The system of claim 39, wherein the
transmitter module is further for transmitting a unique electronic device identifier to a provisioning device, and wherein the system further includes:
a receiver module for:
receiving a unique provisioning device identifier from the provisioning device; and
receiving a communication including the payment information from the provisioning device,
wherein the security module is further for:
determining that a device identifier in the communication matches the stored unique provisioning device identifier; and
in response to determining that the device identifier in the communication matches the stored unique provisioning device identifier, securely storing the payment information, wherein the enabling the payment information to be accessed occurs subsequent to the securely storing the payment information.

48. The system of claim 39, wherein the payment information includes a number associated with a credit card, debit card, gift account, or value account.

49. The system of claim 39, wherein the detection module is for detecting whether mechanical user input has been received within the time period from detecting a proximate POS terminal.

50. The system of claim 39, wherein detecting whether the mechanical input has been locally received at the electronic device includes detecting whether a non-virtual button has been clicked.

51. The system of claim 39, wherein the system comprises a wearable electronic device.

* * * * *